US012597346B2

(12) United States Patent
Ogawa

(10) Patent No.: US 12,597,346 B2
(45) Date of Patent: Apr. 7, 2026

(54) IN-VEHICLE DEVICE, METHOD, COMPUTER PROGRAM, DRIVING ASSISTANCE SERVER, AND DRIVING ASSISTANCE METHOD

(71) Applicants: Sumitomo Electric Industries, Ltd., Osaka (JP); Sumitomo Wiring Systems, Ltd., Yokkaichi (JP); Autonetworks Technologies, Ltd., Yokkaichi (JP)

(72) Inventor: Akihiro Ogawa, Osaka (JP)

(73) Assignees: Sumitomo Electric Industries, Ltd., Osaka (JP); Sumitomo Wiring Systems, Ltd., Yokkaichi (JP); Autonetworks Technologies, Ltd., Yokkaichi (JP)

( * ) Notice: Subject to any disclaimer, the term of this patent is extended or adjusted under 35 U.S.C. 154(b) by 17 days.

(21) Appl. No.: 18/575,886

(22) PCT Filed: Apr. 26, 2022

(86) PCT No.: PCT/JP2022/018887

§ 371 (c)(1),
(2) Date: Jan. 2, 2024

(87) PCT Pub. No.: WO2023/276431

PCT Pub. Date: Jan. 5, 2023

(65) Prior Publication Data

US 2024/0312345 A1 Sep. 19, 2024

(30) Foreign Application Priority Data

Jul. 2, 2021 (JP) ................................ 2021-110815

(51) Int. Cl.
*G08G 1/0967* (2006.01)

(52) U.S. Cl.
CPC .............................. *G08G 1/096791* (2013.01)

(58) Field of Classification Search
CPC ................................................ G08G 1/096791
(Continued)

(56) References Cited

U.S. PATENT DOCUMENTS

2018/0299884 A1* 10/2018 Morita .................. G08G 1/202
2019/0259275 A1* 8/2019 Kubo .................... G08G 1/162
(Continued)

FOREIGN PATENT DOCUMENTS

JP 2012-048489 A 3/2012
JP 2017-139750 A 8/2017
(Continued)

*Primary Examiner* — Luis A Martinez Borrero
(74) *Attorney, Agent, or Firm* — XSENSUS LLP

(57) ABSTRACT

An in-vehicle device includes: a wireless communication device; a driving support device for performing driving support for a vehicle by using driving support information received from an external server through the wireless communication device; an operation determination unit configured to, in response to having received a distribution request for driving support information from another in-vehicle device, perform determination as to whether or not the in-vehicle device is to operate as a substitute for the external server; and a support information transmission device configured to, when the determination by the operation determination unit is positive, transmit driving support information of the vehicle usable by the in-vehicle device to the other in-vehicle device through the wireless communication device.

20 Claims, 20 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 2019/0327212 | A1* | 10/2019 | Nakagawa ............ | H04L 63/105 |
| 2020/0226794 | A1 | 7/2020 | Sugio et al. | |
| 2020/0314609 | A1 | 10/2020 | Harada et al. | |
| 2021/0014643 | A1 | 1/2021 | Kuroda et al. | |
| 2021/0366278 | A1* | 11/2021 | Park ................. | G08G 1/096791 |
| 2022/0250640 | A1 | 8/2022 | Ogawa | |
| 2022/0343241 | A1* | 10/2022 | Jha ......................... | G08G 1/166 |
| 2023/0110467 | A1* | 4/2023 | Jha ................... | G08G 1/096791 701/24 |
| 2023/0282109 | A1* | 9/2023 | Monteuuis ....... | G08G 1/096791 |
| 2023/0311941 | A1* | 10/2023 | Suehiro ............... | B60W 60/001 701/23 |
| 2024/0059326 | A1* | 2/2024 | Lee .................. | G08G 1/096725 |
| 2025/0087091 | A1* | 3/2025 | Hucek .............. | G08G 1/096775 |

FOREIGN PATENT DOCUMENTS

| | | | |
|---|---|---|---|
| JP | 2018-207154 | A | 12/2018 |
| JP | 2020-162031 | A | 10/2020 |
| WO | 2017/111139 | A1 | 6/2017 |
| WO | 2019/065546 | A1 | 4/2019 |
| WO | 2021/002223 | A1 | 1/2021 |

* cited by examiner

IN-VEHICLE DEVICE, METHOD, COMPUTER PROGRAM, DRIVING ASSISTANCE SERVER, AND DRIVING ASSISTANCE METHOD

CROSS-REFERENCE TO RELATED APPLICATIONS

The present application is based on PCT filing PCT/JP2022/018887, filed Apr. 26, 2022, which claims priority from Japanese Patent Application No. 2021-110815, filed Jul. 2, 2021, the entire contents of each are incorporated herein by reference.

TECHNICAL FIELD

This disclosure relates to an in-vehicle device, a method, a computer program, a driving support server, and a driving support method.

BACKGROUND ART

In order to support driving of a vehicle, a connected service by so-called roadside-to-vehicle cooperation is being provided. Examples thereof include traveling support and the like at an intersection based on a dynamic map created by using information from vehicles and so-called infrastructure sensors, such as a LiDAR (Light Detection And Ranging), a camera, and the like provided on a roadside. A creation process of the dynamic map is performed based on data collected from infrastructure sensors and vehicles, in an edge server disposed so as to be able to perform high speed communication with vehicles on roads and infrastructure sensors in an area where vehicles are traveling. The dynamic map is disposed in each vehicle, and an in-vehicle device mounted to each vehicle performs driving support using the dynamic map in accordance with a function provided to the vehicle.

In a case of such a roadside-to-vehicle cooperation system, if communication with the server is interrupted or the server has failed, vehicles cannot acquire the dynamic map. This causes a problem that driving support for each vehicle cannot be performed. Therefore, measures for occurrence of interruption of communication with the server or a failure of the server are necessary.

PATENT LITERATURE 1 indicated below discloses one proposal for solving such a problem. In the technology disclosed in PATENT LITERATURE 1, the communication path with the server is made redundant for the cases of occurrence of interruption of communication between a vehicle and the server and missing of information from the server to a vehicle. For this purpose, in the technology disclosed in PATENT LITERATURE 1, a plurality of communication devices including those for so-called vehicle-to-vehicle communication are provided in a vehicle. Then, when communication between the vehicle and the server has been interrupted, the in-vehicle device mounted to the vehicle searches for another vehicle that can transfer communication data from the server, receives the communication data through vehicle-to-vehicle communication, and uses the communication data in driving support. A peripheral vehicle having received a search signal from another vehicle determines whether or not transfer of communication data from the server is possible, and performs communication if possible. In addition, when communication is not possible, the peripheral vehicle transmits communication indicating that the communication is not possible to the vehicle as the transmission source of the search signal.

CITATION LIST

Patent Literature

PATENT LITERATURE 1: Japanese Laid-Open Patent Publication No. 2020-162031

SUMMARY OF THE INVENTION

Solution to Problem

An in-vehicle device according to a first aspect of the present disclosure includes: a wireless communication device; and a driving support device for performing driving support for a vehicle by using driving support information received from an external server through the wireless communication device. The in-vehicle device further includes: an operation determination unit configured to, in response to having received a distribution request for driving support information from another in-vehicle device, perform determination as to whether or not the in-vehicle device is to operate as a substitute for the external server; and a support information transmission device configured to, when the determination by the operation determination unit is positive, transmit driving support information of the vehicle usable by the in-vehicle device to the other in-vehicle device through the wireless communication device.

A method for causing an in-vehicle device to operate according to a second aspect of the present disclosure includes: a step, by a computer, of performing driving support for a vehicle by using driving support information received from an external server through a wireless communication device: a step, by the computer, of performing, in response to having received a distribution request for driving support information from another in-vehicle device, determination as to whether or not the computer is to operate as a substitute for the external server; and a step, by the computer, of transmitting, when the determination in the step of performing the determination is positive, the driving support information usable by the computer to the other in-vehicle device through the wireless communication device.

A computer program according to a third aspect of the present disclosure causes a computer connected to a wireless communication device to function as: a driving support device for performing driving support for a vehicle by using driving support information received from an external server through the wireless communication device; an operation determination unit configured to, in response to having received a distribution request for driving support information from another in-vehicle device, perform determination as to whether or not the computer is to operate as a substitute for the external server; and a support information transmission device configured to, when the determination by the operation determination unit is positive, transmit the support information usable by the computer to the other in-vehicle device through the wireless communication device.

A driving support server according to a fourth aspect of the present disclosure is configured to create driving support information in a management region and transmit the driving support information to vehicles in the management region. The driving support server includes: a driving support information creation unit configured to receive sensor data from a sensor that detects a traffic state of the management region, and create the driving support information; a substitute server vehicle list creation unit configured to collect vehicle information regarding vehicles present in the management region, and create a substitute server vehicle list being a list of vehicles capable of operating as a substitute server for the driving support server; and a transmission device configured to add the substitute server vehicle list to the driving support information and transmit the resultant driving support information to the vehicle.

A driving support method according to a fifth aspect of the present disclosure is performed in a driving support system including a driving support server configured to create driving support information in a management region and transmit the driving support information to vehicles in the management region. The driving support method includes: a step, by a computer, of receiving sensor data from a sensor that detects a traffic state of the management region, and creating the driving support information; a step, by the computer, of collecting vehicle information regarding vehicles present in the management region, and creating a substitute server vehicle list being a list of vehicles capable of operating as a substitute server for the driving support server; and a step, by the computer, of adding the substitute server vehicle list to the driving support information, and transmitting the resultant driving support information to the vehicles.

The above-described and other objects, features, aspects, and advantages of this invention will be clarified from the following detailed description regarding this invention as understood in connection with the accompanying drawings.

DETAILED DESCRIPTION

Figure 1:
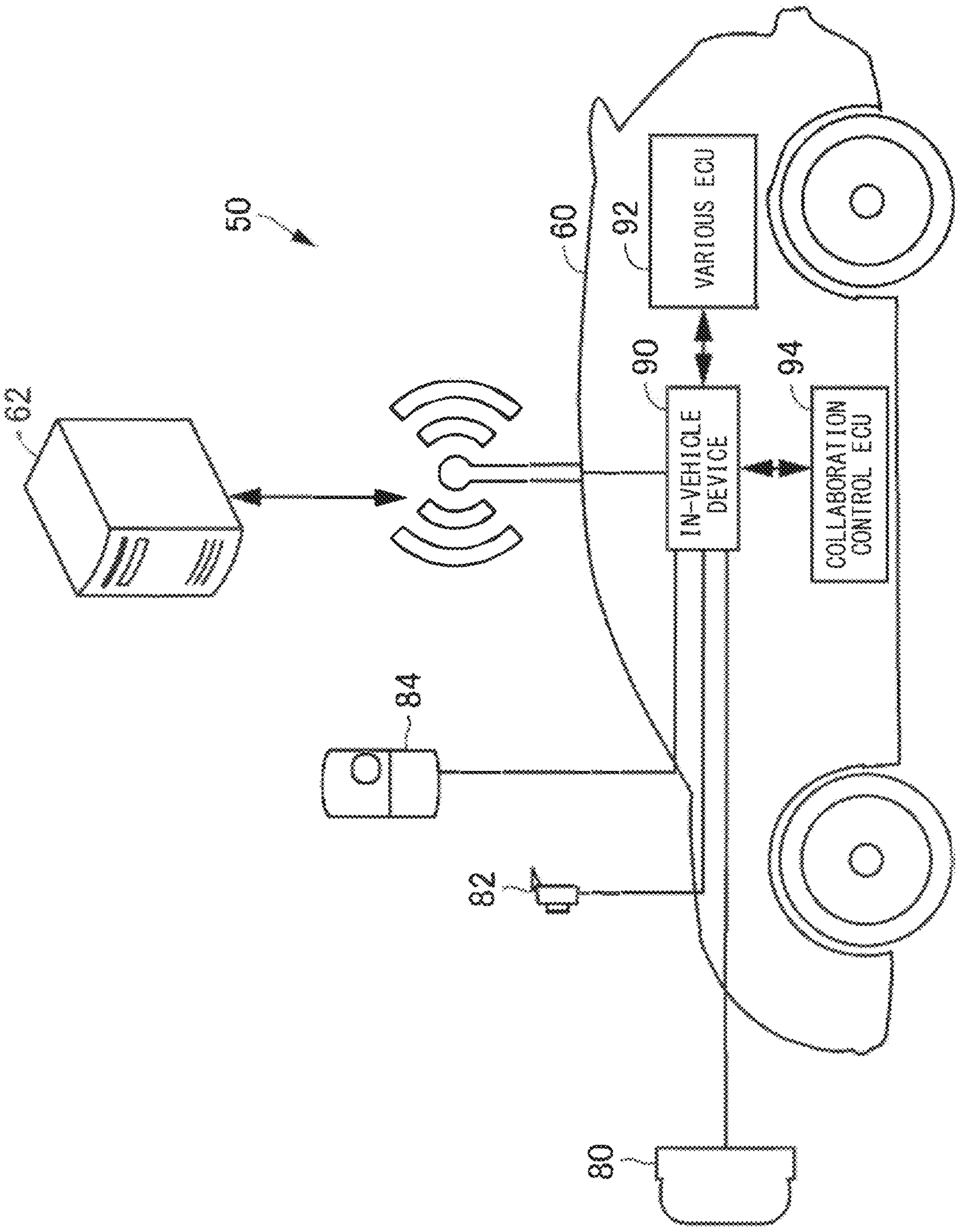
FIG. 1 shows a configuration of a driving support system according to an embodiment of this disclosure.

Problems to be Solved by this Disclosure

In the technology described in PATENT LITERATURE 1, after communication with the server has been interrupted, a vehicle searches for a vehicle to be switched. Therefore, it is difficult to apply the technology described in PATENT LITERATURE 1 to such a highly real-time driving support in which a dynamic map is shared. In the first place, there is also a problem that, in such a case where the server has failed, driving support information cannot be acquired from any route. Therefore, there is a demand for a technology that is highly real-time and that allows acquisition of the driving support information as surely as possible.

An object of this disclosure is to provide an in-vehicle device, a method, a computer program, a driving support server, and a driving support method that are highly real-time and that allow acquisition of the driving support information as surely as possible.

Effect of this Disclosure

According to this disclosure, it is possible to provide an in-vehicle device, a method, a computer program, a driving support server, and a driving support method that are highly real-time and that allow acquisition of the driving support information as surely as possible.

Description of Embodiments of the Present Disclosure

In the description below and the drawings, the same components are denoted by the same reference signs. Therefore, detailed descriptions thereof are not repeated. At least some parts of the disclosure described below may be combined together as desired.

(1) An in-vehicle device according to a first aspect of the present disclosure includes: a wireless communication device; and a driving support device for performing driving support for a vehicle by using support information for supporting driving and received from an external server through the wireless communication device. The in-vehicle device further includes: an operation determination unit configured to, in response to having received a distribution request for support information from another in-vehicle device, perform determination as to whether or not the in-vehicle device is to operate as a substitute for the external server; and a support information transmission device configured to, when the determination by the operation determination unit is positive, transmit support information of the vehicle usable by the in-vehicle device to the other in-vehicle device through the wireless communication device.

In a case where, while the in-vehicle device is receiving the support information from the external server, the communication is interrupted, the operation determination unit determines whether or not the in-vehicle device is to operate as a substitute for the external server. When it has been determined that the in-vehicle device is to operate, the support information transmission device transmits support information usable by the in-vehicle device to another vehicle. The other vehicle that cannot communicate with the external server can perform driving support by using the support information transmitted from this vehicle. At this time, it is not necessary to search in advance whether or not this vehicle can operate as the server. As a result, even when a trouble has occurred in the external server, driving support can be immediately continued in many vehicles.

(2) The support information received by the driving support device from the external server may include driving support information and a list of vehicles capable of operating as a substitute server, and the operation determination unit may include a list inquiry unit configured to inquire the list and perform determination as to whether or not the in-vehicle device is to operate as a substitute for the external server, in accordance with whether or not the vehicle having mounted thereto the in-vehicle device is listed in the list.

A list of vehicles as the support information has been distributed to each vehicle in advance. Therefore, a vehicle in which communication with the external server has been interrupted need not search which of other vehicles the vehicle should communicate with, and can immediately specify the vehicle from which necessary support information is to be obtained, by using this list.

(3) The in-vehicle device may further include a reception possibility determination unit configured to perform determination as to whether or not the support information is receivable from the external server through the wireless communication device, and the support information transmission device may include a transfer device configured to, when the determination by the list inquiry unit is positive and the determination by the reception possibility determination unit is positive, transfer the driving support information received from the external server to the other in-vehicle device, in response to having received the distribution request for the support information from the other in-vehicle device.

There are cases where, although the vehicle itself can receive the support information from the external server, another vehicle is requesting this vehicle to distribute the driving support information. This means that some trouble in which only the other vehicle cannot communicate with the external server has occurred. The in-vehicle device according to this disclosure can receive the support information through communication with the external server, and thus can transfer the driving support information thereof to the other vehicle. As a result, the vehicle in which some communication trouble has occurred can also immediately acquire the driving support information.

(4) The in-vehicle device may further include a buffer configured to store, in a first-in and first-out manner, the distribution request received from the other vehicle, and the transfer device may read out the distribution request from the buffer, and if an elapsed time period from a reception time of the read out distribution request to a current time is longer than a threshold time period, may ignore the distribution request.

When a large number of distribution requests are concentrated, a certain time period may be required to process the distribution requests. When a certain time period has elapsed from reception of a distribution request, the vehicle may already have received driving support information transferred from another vehicle. Therefore, in such a case, by ignoring the distribution request, it is possible to reduce the communication traffic and focus on the response in real time.

(5) The in-vehicle device may further include an internal server configured to construct driving support information by using information usable by the in-vehicle device. The support information transmission device may include: a server initialization unit configured to, when the determination by the list inquiry unit is positive and the determination by the reception possibility determination unit is negative, initialize and activate the internal server in response to having received a distribution request for the support information from outside; and a distribution device configured to, in response to having received a distribution request for the support information from the other in-vehicle device, distribute the driving support information generated by the internal server, to the other in-vehicle device.

When a vehicle that can communicate with the external server and that has mounted thereto the in-vehicle device is listed in the list, the in-vehicle device operates as the substitute server. The server initialization unit activates the internal server, and the internal server generates driving support information by using information that can be acquired. When a distribution request for support information has been received from another vehicle, the distribution device can quickly distribute the generated driving support information. As a result, even when some trouble has occurred in the external server, many vehicles can quickly acquire the driving support information.

(6) The in-vehicle device may further include a buffer configured to store, in a first-in and first-out manner, the distribution request received from the other vehicle, and the distribution device may read out the distribution request from the buffer, and if an elapsed time period from a reception time of the read out distribution request to a current time is longer than a threshold time period, may ignore the distribution request.

When a large number of distribution requests are concentrated, a certain time period may be required to process the distribution requests. When a certain time period has elapsed from reception of a distribution request, the vehicle may already have received driving support information distributed from another vehicle. Therefore, in such a case, by ignoring the distribution request, it is possible to reduce the communication traffic and focus on the response in real time.

(7) When the determination by the list inquiry unit is positive and the determination by the reception possibility determination unit is negative, the server initialization unit may initialize and activate the internal server in response to having received a plurality of the distribution requests of which the number exceeds a predetermined threshold, from outside within a most recent predetermined time period.

When the number of distribution requests is small, it cannot be determined whether a trouble has occurred in the external server or whether only a specific vehicle cannot communicate with the external server. When the number of distribution requests received in a certain time period exceeds a threshold, it can be determined that a trouble has occurred in the external server. A wasteful process of activating the internal server even though there is no need to can be prevented.

(8) The server initialization unit may include: a cooperation node candidate selection unit configured to select a plurality of cooperation node candidates out of a plurality of other vehicles communicable through the wireless communication device: a processing device selection unit configured to select an arithmetic processing device for realizing a function of the internal server; a dynamic state information acquisition unit configured to acquire information about the selected arithmetic processing device and a dynamic state regarding communication with the arithmetic processing device, and information about a dynamic state regarding communication with outside: an initial information decision unit configured to select at least one cooperation node, based on the selected cooperation node candidates and the acquired dynamic states, and decide a type of sensor data collected from the cooperation node, a vehicle as a destination to which the driving support information is distributed, and a distribution cycle of the driving support information; and a transfer unit configured to transfer information decided by the initial information decision unit to a storage device of the internal server.

When activating the internal server, the server initialization unit appropriately sets an operation condition for the internal server in accordance with the situation at that time. As a result, the internal server can quickly generate necessary driving support information, based on the newest information, and can distribute the driving support information to each vehicle.

(9) The in-vehicle device may further include a timer configured to cause the server initialization unit to periodically operate.

The server initialization unit periodically operates. The information used by the internal server for the driving support information is updated every time the server initialization unit periodically operates. Since the internal server generates the driving support information always based on the newest information and distributes the driving support information, each vehicle can quickly use accurate driving support information.

(10) The in-vehicle device may further include a request transmission device configured to, when the determination by the list inquiry unit is negative and the determination by the reception possibility determination unit is negative, transmit a distribution request for the support information to at least one of the vehicles listed in the list.

In a case where, while the vehicle itself is not listed in the list of vehicles that operate as a substitute server, communication with the server is interrupted, it is necessary to acquire the driving support information from an external vehicle. Since the list has been distributed in advance, if a distribution request is transmitted to at least one vehicle listed in the list, the driving support information can be quickly acquired.

(11) The request transmission device may transmit the distribution request staring from a top of the list in order, until receiving a reply of the support information.

There are cases where some vehicles listed in the list cannot activate the internal server for some reason or take a long time period in processing a large number of distribution requests. In such a case, the driving support information cannot quickly be acquired. Thus, by sending a distribution request to vehicles listed in the list in order, the driving support information can be acquired as early as possible from a vehicle that can distribute the driving support information.

(12) The request transmission device may rearrange the list at random before starting transmission of the distribution request.

When the list is rearranged at random, concentration of the distribution requests to some vehicles listed in the list can be prevented. As a result, the load is distributed among the vehicles listed in the list, and every vehicle can quickly acquire the driving support information.

(13) The request transmission device may select a vehicle at random from the list and transmit the distribution request thereto.

When a vehicle is selected at random from the list and the distribution request is transmitted thereto, concentration of the distribution requests to some vehicles listed in the list can be prevented. As a result, the load is distributed among the vehicles listed in the list, and every vehicle can quickly acquire the driving support information.

(14) The in-vehicle device may further include an information transmission device configured to, in response to having received an information distribution request for requesting transmission of information regarding a static specification and a dynamic state of the in-vehicle device from the external server, transmit, to the external server, information regarding: the static specification or the dynamic state of the in-vehicle device; and a static specification or a dynamic state of a calculation resource or a communication resource usable by the in-vehicle device in the in-vehicle device.

Accordingly, when creating a list of the substitute server vehicles, the external server can select appropriate vehicles, create an appropriate list, and distribute the list. Examples of the static specification include the speed of wireless communication with the outside of the vehicle, the communication band of the in-vehicle network, processing capacities of relevant ECUs, and the like. Examples of the dynamic state include the communicated data amount in wireless communication with the outside of the vehicle, the communicated data amount in the in-vehicle network, load states of ECUs, and the number of peripheral vehicles communicable with a communication quality at a certain level or higher. Only one or both of the static specification and the dynamic state may be used. The same also applies to the calculation resources and communication resources. The order of the substitute server vehicles in the substitute server vehicle list is not limited in particular. For example, a substitute server vehicle that has a high score decided by a combination of items of the static specification and the dynamic state described above may be at a higher order.

(15) The in-vehicle device may further include: a periodic operation determination unit configured to periodically perform determination as to whether or not the in-vehicle device is to operate as a substitute for the external server; and a notification device configured to, when a result of the determination by the periodic operation determination unit is different from a preceding result, notify the external server of the result of the determination.

Since the state of a vehicle always changes, the amount of calculation resources usable in the vehicle also always changes. When the external server receives a notification regarding the change, the external server can appropriately update the list of vehicles capable of operating as the substitute server. The list distributed to the vehicles receiving the support information from the external server is also appropriately updated at the next distribution timing. As a result, even if each vehicle can no longer communicate with the external server, the vehicle can quickly acquire appropriate support information from a vehicle operating as the substitute server.

(16) A method for causing an in-vehicle device to operate according to a second aspect of the present disclosure includes: a step, by a computer, of performing driving support for a vehicle by using support information received from an external server through a wireless communication device: a step, by the computer, of performing, in response to having received a distribution request for support information from another in-vehicle device, determination as to whether or not the computer is to operate as a substitute for the external server; and a step, by the computer, of transmitting, when the determination in the step of performing the determination is positive, the support information usable by the computer to the other in-vehicle device through the wireless communication device.

In a case where, while the in-vehicle device is receiving the support information from the external server, the communication is interrupted, determination as to whether or not the in-vehicle device is to operate as a substitute for the external server is performed. When it has been determined that the in-vehicle device is to operate as a substitute for the external server, the in-vehicle device transmits support information usable by the in-vehicle device to another vehicle. The other vehicle that cannot communicate with the external server can perform driving support by using the support information transmitted from this vehicle. As a result, even when a trouble has occurred in the external server, driving support can be immediately continued in many vehicles.

(17) A computer program according to a third aspect of the present disclosure causes a computer connected to a wireless communication device to function as: a driving support device for performing driving support for a vehicle by using support information received from an external server through the wireless communication device; an operation determination unit configured to, in response to having received a distribution request for support information from another in-vehicle device, perform determination as to whether or not the computer is to operate as a substitute for the external server; and a support information transmission device configured to, when the determination by the operation determination unit is positive, transmit the support information usable by the computer to the other in-vehicle device through the wireless communication device.

In a case where, while the in-vehicle device is receiving the support information from the external server, the communication is interrupted, the operation determination unit performs determination as to whether or not the in-vehicle device is to operate as a substitute for the external server. When the operation determination unit has determined that the in-vehicle device is to operate, the support information transmission device transmits support information usable by the in-vehicle device to another vehicle. The other vehicle that cannot communicate with the external server can perform driving support by using the support information transmitted from this vehicle. As a result, even when a trouble has occurred in the external server, driving support can be immediately continued in many vehicles.

(18) A driving support server according to a fourth aspect of the present disclosure is configured to create support information for supporting driving in a management region and transmit the support information to vehicles in the management region. The driving support server includes: a support information creation unit configured to receive sensor data from a sensor that detects a traffic state of the management region, and create the support information: a substitute server vehicle list creation unit configured to collect vehicle information regarding vehicles present in the management region, and create a substitute server vehicle list being a list of vehicles capable of operating as a substitute server for the driving support server; and a transmission device configured to add the substitute server vehicle list to the support information and transmit the resultant support information to the vehicles.

In a case where, while the in-vehicle device is receiving the support information from the driving support server, the communication is interrupted, each vehicle needs to search for a vehicle that operates as a substitute for the driving support server. However, since the driving support server creates the substitute server vehicle list in advance, adds the substitute server vehicle list to the support information, and distributes the resultant support information, each vehicle can quickly determine from which vehicle the support information is to be acquired. As a result, even when a trouble has occurred in the driving support server, the support information can be immediately acquired in many vehicles.

(19) The substitute server vehicle list creation unit may include a list-by-division-region creation unit configured to divide the management region into a plurality of division regions and create the substitute server vehicle list for each of the plurality of division regions, and the transmission device may include a region-by-region transmission device configured to, for each of the plurality of division regions, attach the substitute server vehicle list for the division region to the support information, and transmit the resultant support information to each vehicle present in the division region.

The region managed by the driving support server is divided into a plurality of division regions, a substitute server vehicle list is created for each division region, and to each division region, the substitute server vehicle list for the division region is distributed. When communication with the driving support server has been interrupted, each vehicle uses this substitute server vehicle list, thereby being able to immediately determine to which vehicle the distribution request should be sent in order to acquire the support information. As a result, even when communication with the driving support server has been interrupted, each vehicle can quickly acquire the support information.

(20) A driving support method according to a fifth aspect of the present disclosure is performed in a driving support system including a driving support server configured to create support information for supporting driving in a management region and transmit the support information to vehicles in the management region. The driving support method includes: a step, by a computer, of receiving sensor data from a sensor that detects a traffic state of the management region, and creating the support information; a step, by the computer, of collecting vehicle information regarding vehicles present in the management region, and creating a substitute server vehicle list being a list of vehicles capable of operating as a substitute server for the driving support server; and a step, by the computer, of adding the substitute server vehicle list to the support information, and transmitting the resultant support information to the vehicles.

In a case where, while the in-vehicle device is receiving the support information from outside, the communication is interrupted, each vehicle needs to search for a vehicle that operates so as to distribute the support information. However, since the substitute server vehicle list is created in advance and is added to the support information and the resultant support information is distributed, each vehicle can quickly determine from which vehicle the support information is to be acquired. As a result, even when a trouble has occurred in communication with equipment that distributes the driving support information, the support information can be immediately acquired in each vehicle.

DETAILS OF EMBODIMENTS OF THE PRESENT DISCLOSURE

Hereinafter, specific examples of an in-vehicle device, a method, a computer program, a driving support server, and a driving support method according to embodiments of the present disclosure will be described with reference to the drawings. The present disclosure is not limited to these examples and is indicated by the claims, and is intended to include meaning equivalent to the claims and all modifications within the scope of the claims.

1. First Embodiment

1. Configuration (1) Entire Configuration

With reference to FIG. 1, a driving support system 50 according to the first embodiment includes an edge server 62 and a vehicle 60.

With reference to FIG. 1, the vehicle 60 has various sensors such as a LiDAR 84, an in-vehicle camera 82, and a millimeter wave radar 80. The vehicle 60 further includes an in-vehicle device 90 for collecting sensor data from these sensors, transmitting the sensor data to the edge server 62 through wireless communication, receiving information for driving support from the edge server 62, and using the information in driving support. The information for driving support is a dynamic map, for example. The vehicle 60 further includes: various ECUs 92 for respectively controlling components of the vehicle 60 in accordance with control by the in-vehicle device 90; and a collaboration control ECU 94 for executing, through cooperation with the in-vehicle device 90, a process when communication with the edge server 62 has been interrupted or when a distribution request for dynamic map has been received from another vehicle.

In the following, configurations of the components of the driving support system 50 will be described.

(2) In-Vehicle Device 90

Figure 2:
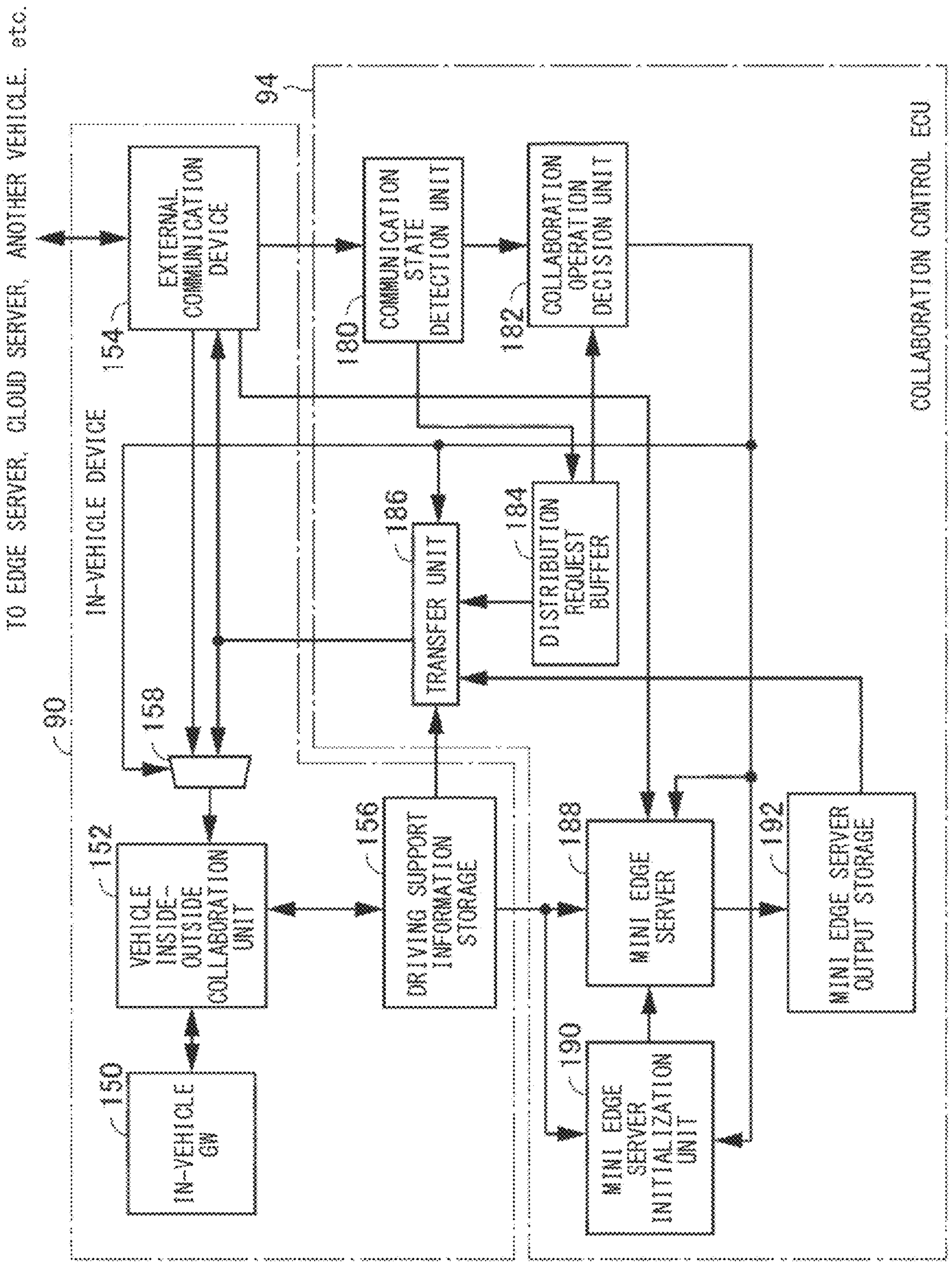
FIG. 2 is a block diagram showing a functional configuration of an in-vehicle device according to the embodiment of this disclosure.

With reference to FIG. 2, the in-vehicle device 90 includes: an external communication device 154; and an in-vehicle gateway 150 which controls, through a network (not shown) mounted to the vehicle 60, communication between a vehicle inside-outside collaboration unit 152, and various sensors and various ECUs, etc., provided in the vehicle 60. The in-vehicle device 90 further includes the vehicle inside-outside collaboration unit 152 which receives driving support information such as a dynamic map from the edge server 62, sensor data from the various sensors provided in the vehicle, and information regarding the operation states of the various ECUs from the various ECUs. The in-vehicle device 90 further includes: a driving support information storage 156 for storing pieces of information including the driving support information received by the vehicle inside-outside collaboration unit 152; and a selection unit 158 for selecting, in accordance with control from the collaboration control ECU 94, a dynamic map received by the external communication device 154 during a normal state, and a dynamic map generated by the collaboration control ECU 94 when communication with the edge server 62 has been interrupted, and inputting the selected dynamic map to the vehicle inside-outside collaboration unit 152.

(3) Collaboration Control ECU 94

(I) Entire Configuration

With reference to FIG. 2, the collaboration control ECU 94 mounted to the vehicle 60 includes, as a function unit thereof, a communication state detection unit 180 which monitors communication by the external communication device 154, and executes a process of detecting the communication states with the edge server 62 and another vehicle, and a process of extracting a distribution request for dynamic map received from another vehicle. The collaboration control ECU 94 further includes: a distribution request buffer 184 for temporarily storing, in a first-in and first-out manner, the distribution request extracted by the communication state detection unit 180; and a collaboration operation decision unit 182 which decides an operation mode of collaboration operation by the in-vehicle device 90, based on the communication states detected by the communication state detection unit 180 and the number of the distribution requests stored in the distribution request buffer 184.

The collaboration control ECU 94 further includes a mini edge server 188 for generating, based on usable information stored in the driving support information storage 156, a map similar to the dynamic map received from the edge server 62. The mini edge server 188 functions as an internal server of the vehicle 60. The collaboration control ECU 94 further include a mini edge server initialization unit 190 for activating the mini edge server 188 in response to detection by the collaboration operation decision unit 182 of interruption of communication between the external communication device 154 and the edge server 62. At this time, the mini edge server initialization unit 190 initializes the mini edge server 188 so as to appropriately operate, by extracting or generating information necessary for a dynamic map by the mini edge server 188 from information stored in the driving support information storage 156, and by storing the necessary information into storages in the mini edge server 188. The collaboration control ECU 94 further includes: a mini edge server output storage 192 for storing driving support information such as a dynamic map outputted from the activated mini edge server 188; and a transfer unit 186 for selecting appropriate data in accordance with the operation mode decided by the collaboration operation decision unit 182 and transmitting the selected data to the edge server 62 through the external communication device 154. The transfer unit 186 further, in response to a distribution request stored in the distribution request buffer 184, reads out a dynamic map from the driving support information storage 156 or the mini edge server output storage 192 in accordance with the operation mode, and transmits the dynamic map to the transmission source of the distribution request through the external communication device 154, and inputs the dynamic map to the vehicle inside-outside collaboration unit 152 through the selection unit 158.

The operation mode decided by the collaboration operation decision unit 182 includes a normal mode, a transfer mode, and a distribution mode.

The normal mode is an operation mode performed when: communication with the edge server 62 is normally performed; and no distribution request has been received.

The transfer mode is an operation mode performed when: communication with the edge server 62 is normally performed; and a distribution request has been received from another vehicle.

The distribution mode is an operation mode performed when: communication with the edge server 62 has been interrupted; and distribution requests of which the number exceeds a threshold have been received from other vehicles within a predetermined time period.

In the normal mode, the in-vehicle device 90 transmits sensor data stored in the driving support information storage 156, to the edge server 62. In the transfer mode, in addition to the operation in the normal mode, the in-vehicle device 90 transmits the dynamic map downloaded from the edge server 62 and stored in the driving support information storage 156, to the transmission source of the distribution request. The mini edge server 188 does not operate in the normal mode and the transfer mode. The mini edge server 188 operates only in the distribution mode.

(II) Mini Edge Server 188

Figure 3:
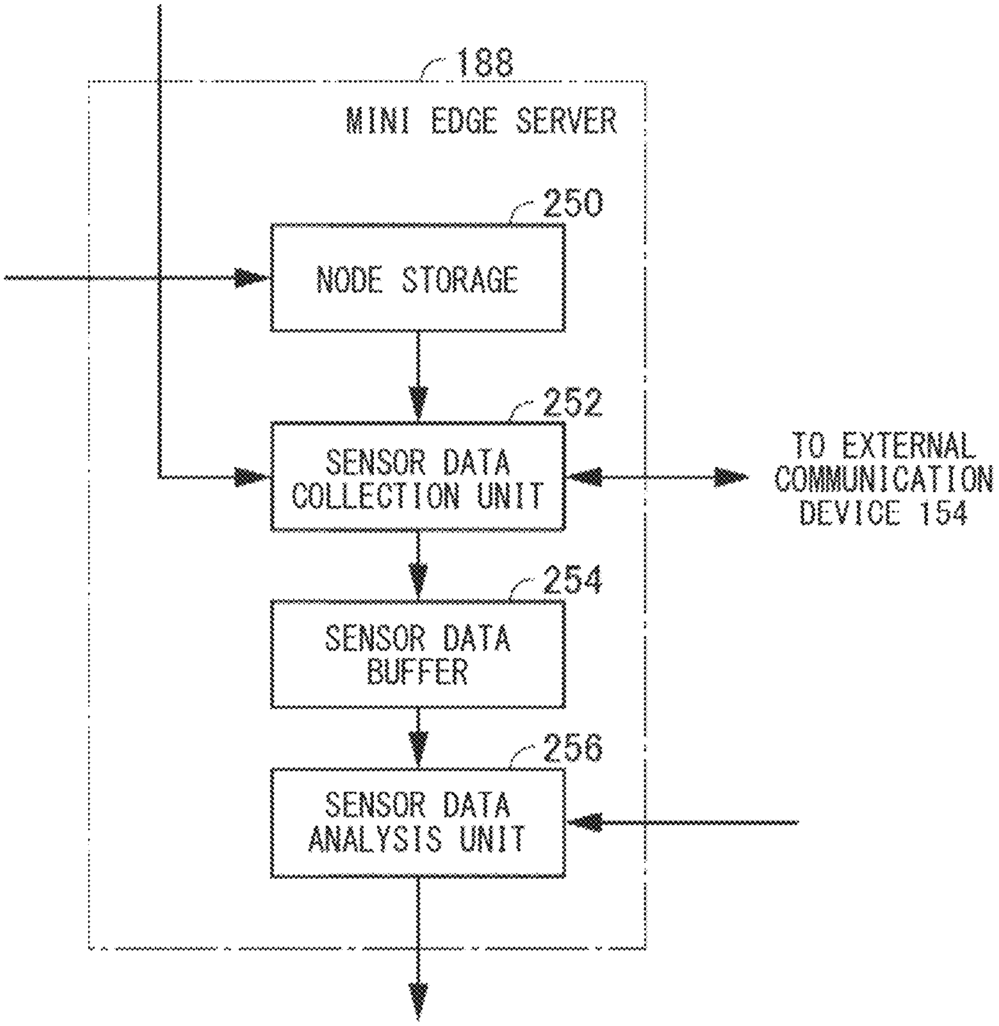
FIG. 3 is a block diagram showing a functional configuration of a mini edge server shown in FIG. 2.

With reference to FIG. 3, the mini edge server 188 includes: a node storage 250 which stores other vehicles and infrastructure sensors from which sensor data is collected when a dynamic map is to be created, and vehicles, etc., (these vehicles and infrastructure sensors will be referred to as "cooperation node") as the destination to which the generated dynamic map is distributed; and a sensor data collection unit 252 for collecting, based on information of the cooperation nodes stored in the node storage 250, sensor data from other vehicles through the external communication device 154, and from the sensors of the own vehicle through the in-vehicle device 90.

The mini edge server 188 further includes: a sensor data buffer 254 for temporarily storing sensor data collected by the sensor data collection unit 252; and a sensor data analysis unit 256 for analyzing the sensor data stored in the sensor data buffer 254, and merging the result of the analysis and the dynamic map received from the edge server 62 when communication with the edge server 62 has been possible, to create a new dynamic map.

(III) Mini Edge Server Initialization Unit 190

Figure 4:
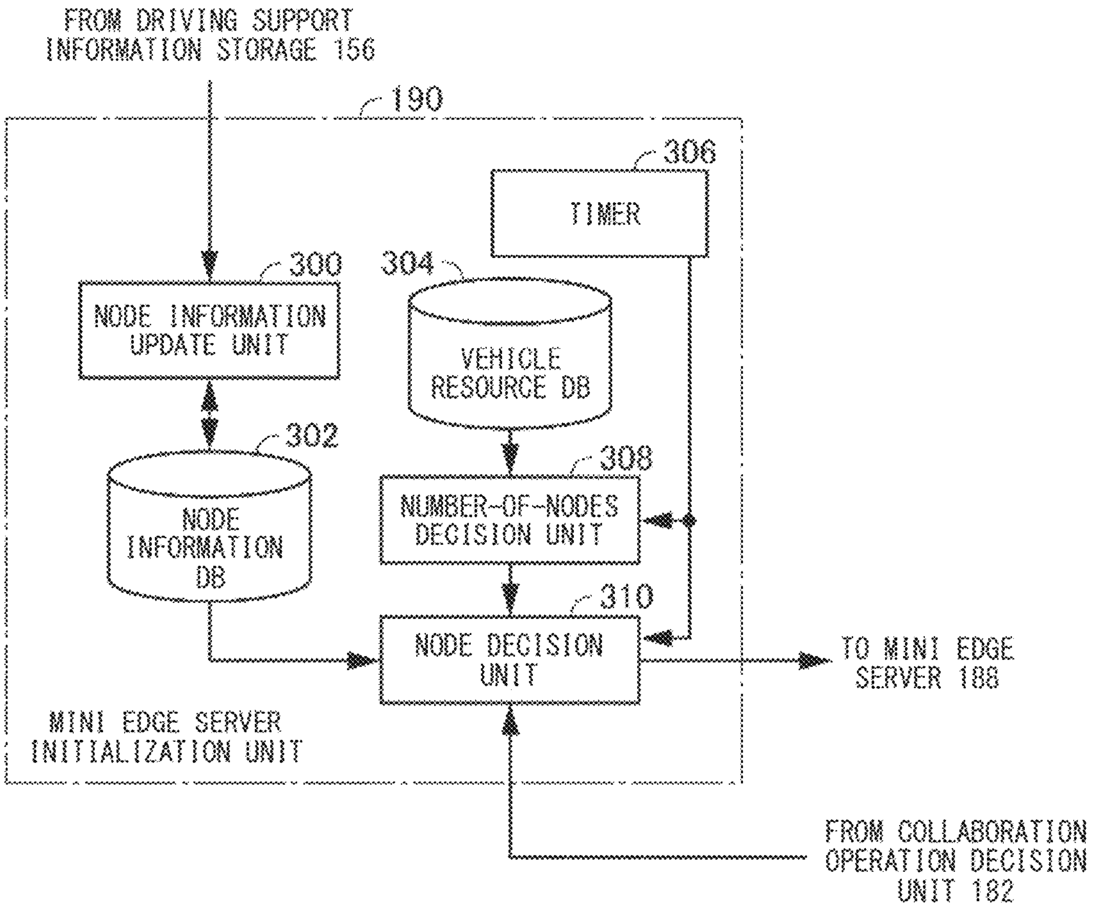
FIG. 4 is a block diagram showing a functional configuration of a mini edge server initialization unit shown in FIG. 2.

With reference to FIG. 4, the mini edge server initialization unit 190 includes: a node information DB 302 in which information regarding nodes, such as peripheral vehicles and infrastructure sensors, that are communicable with the vehicle 60 is stored and managed; and a node information update unit 300 for updating the information stored in the node information DB 302 by using information obtained from other nodes through communication and stored in the driving support information storage 156. The mini edge server initialization unit 190 further includes: a vehicle resource DB 304 for storing specifications regarding calculation resources, communication resources, sensors, and the like of the own vehicle; and a timer 306 for periodically triggering initialization of the mini edge server 188 by the mini edge server initialization unit 190. The mini edge server initialization unit 190 further includes a number-of-nodes decision unit 308 which, in response to an initialization instruction by the timer 306, decides the number of nodes to be selected as the cooperation nodes, with reference to the vehicle resource DB 304. The mini edge server initialization unit 190 further includes a node decision unit 310 which, in response to a trigger by the timer 306 or an initialization instruction for the mini edge server 188 from the collaboration operation decision unit 182, selects nodes appropriate as the cooperation nodes by the number decided by the number-of-nodes decision unit 308 from the node information DB 302, and stores the selected nodes into the node storage 250 of the mini edge server 188.

The cooperation nodes selected by the node decision unit 310 include both of data collection vehicles from which sensor data is collected, and distribution vehicles as the destinations to which a dynamic map generated by the mini edge server 188 is distributed. The sets of both may or may not match each other.

(4) Edge Server 62

Figure 5:
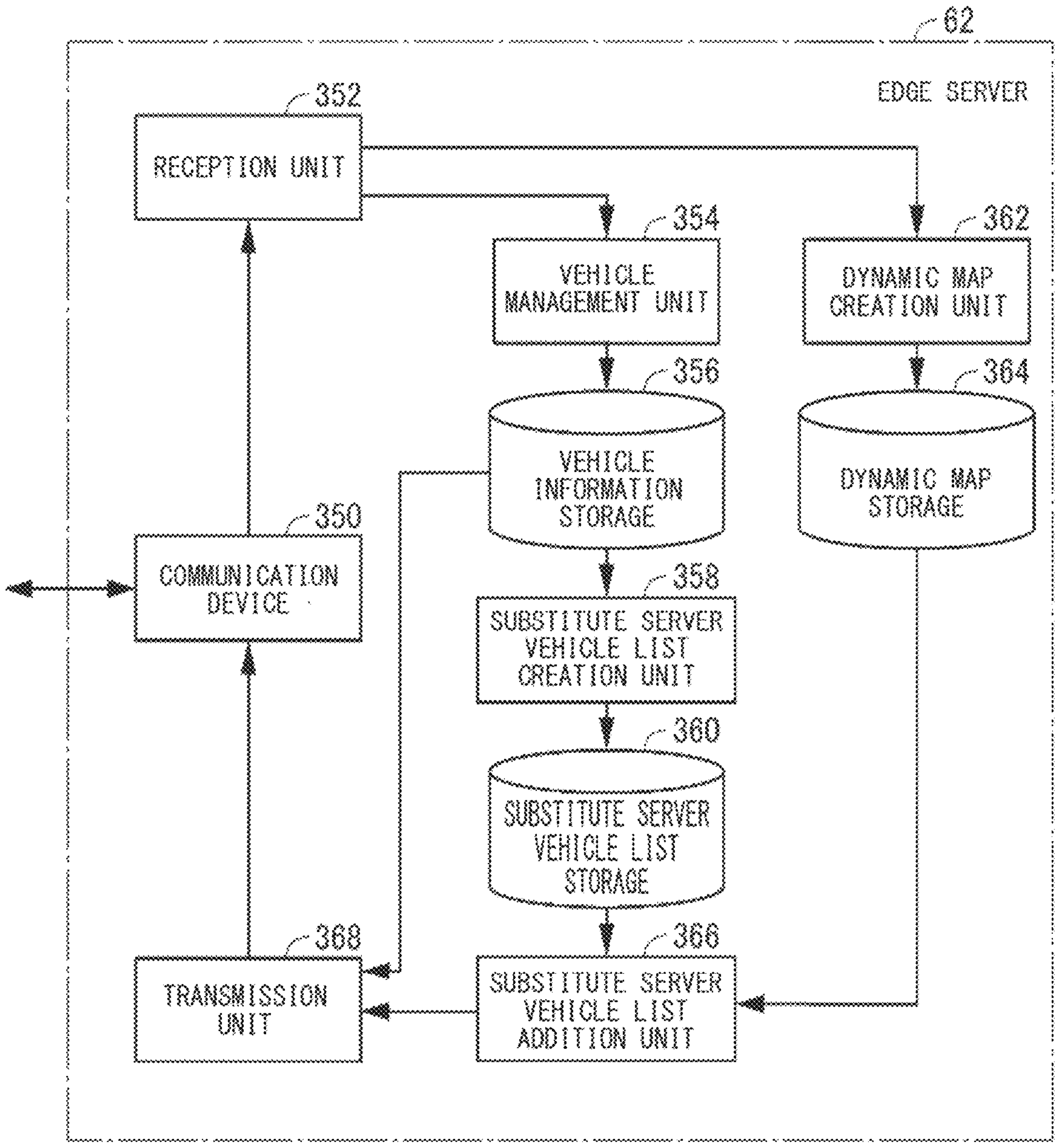
FIG. 5 is a block diagram showing a functional configuration of an edge server shown in FIG. 1.

With reference to FIG. 5, the edge server 62 includes a communication device 350 for performing communication with outside through wired or wireless communication; and a reception unit 352 which performs a process of appropriately assigning data received by the communication device 350, in accordance with the content of the data. The edge server 62 further includes: a dynamic map creation unit 362 for creating a dynamic map from sensor data received from each vehicle and infrastructure sensor by the reception unit 352 and a high-definition map stored in advance; and a dynamic map storage 364 storing the dynamic map created by the dynamic map creation unit 362.

The edge server 62 further includes: a vehicle management unit 354 for receiving, from the reception unit 352, vehicle information received from vehicles in a region managed by the edge server 62 and managing the vehicle information; and a vehicle information storage 356 being a database that stores the vehicle information managed by the vehicle management unit 354. The edge server 62 further includes a substitute server vehicle list creation unit 358 for creating, based on the vehicle information stored in the vehicle information storage 356, a substitute server vehicle list that lists vehicles that can serve as a substitute for the edge server 62 if communication between a vehicle and the edge server 62 has been interrupted; and a substitute server vehicle list storage 360 for storing the substitute server vehicle list created by the substitute server vehicle list creation unit 358.

The edge server 62 further includes a substitute server vehicle list addition unit 366 for periodically reading out the dynamic map stored in the dynamic map storage 364 and adding, to the dynamic map, the substitute server vehicle list stored in the substitute server vehicle list storage 360. The edge server 62 further includes a transmission unit 368 which transmits, as the driving support information, through the communication device 350, the dynamic map having added thereto the substitute server vehicle list, to the transmission destination vehicle determined based on the vehicle information stored in the vehicle information storage 356.

(5) Program Configuration (I) Edge Server 62

A program that realizes the substitute server vehicle list creation unit 358 of the edge server 62 has a control structure as below. In this embodiment, the substitute server vehicle list is created only for an intersection region for which driving support is particularly necessary, but may be created for a region other than that.

Figure 6:
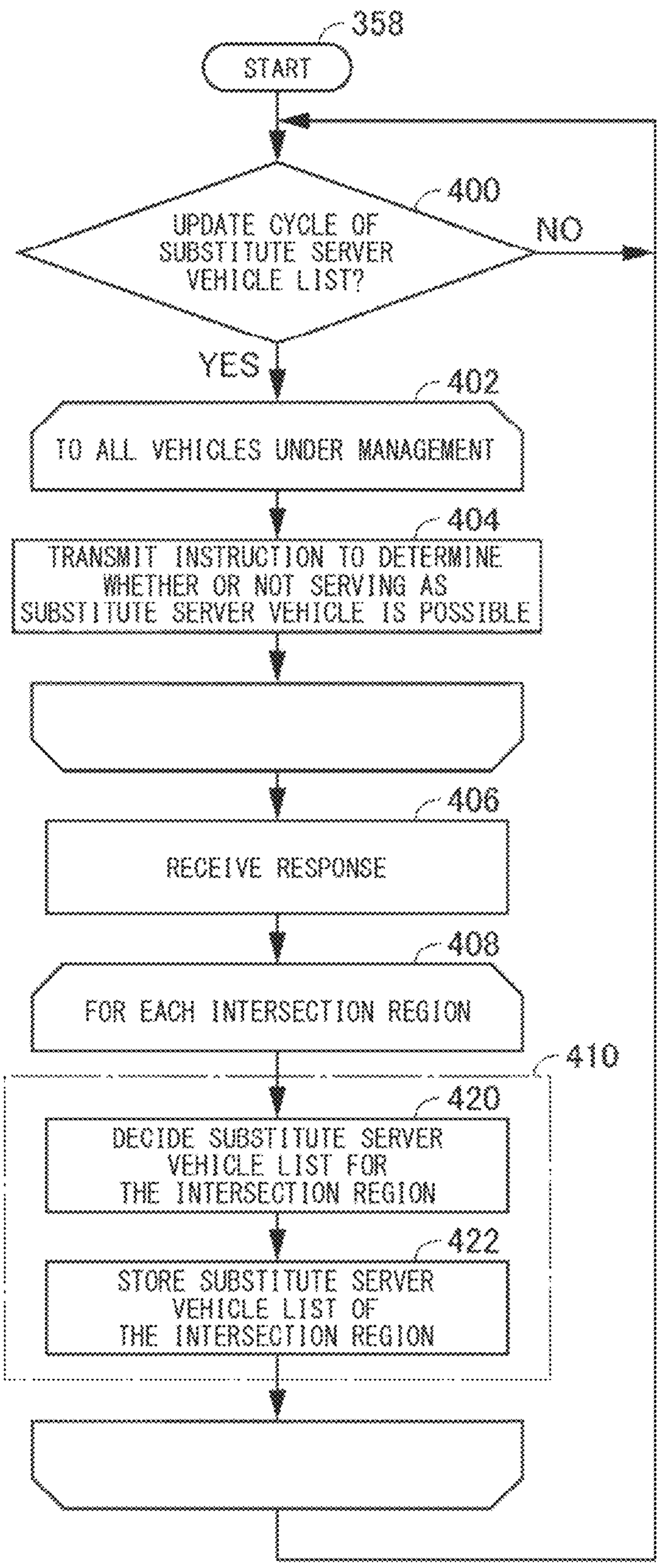
FIG. 6 is a flowchart of a program executed by a substitute server.

With reference to FIG. 6, this program includes step 400 of standing by until arrival of the update cycle of the substitute server vehicle list, and step 402 of executing step 404 on all vehicles under management upon arrival of the update cycle of the substitute server vehicle list.

In step 404, this program transmits, to each vehicle, an instruction that requests the vehicle to determine whether or not operating as a substitute server is possible and transmit the result to the edge server 62.

This program further includes, following step 402, step 406 of receiving a response from each vehicle under management, and step 408 of executing step 410 of creating a substitute server vehicle list for an intersection region managed by the edge server 62.

Step 410 includes: step 420 of deciding, based on the response from each vehicle received in step 406, a substitute server vehicle list composed of vehicles, among vehicles present in the target intersection region, that have performance of functioning as a substitute server and dynamic resources; and step 422 of storing the substitute server vehicle list decided in step 420 into the substitute server vehicle list storage 360.

(II) In-Vehicle Device 90

Figure 7:
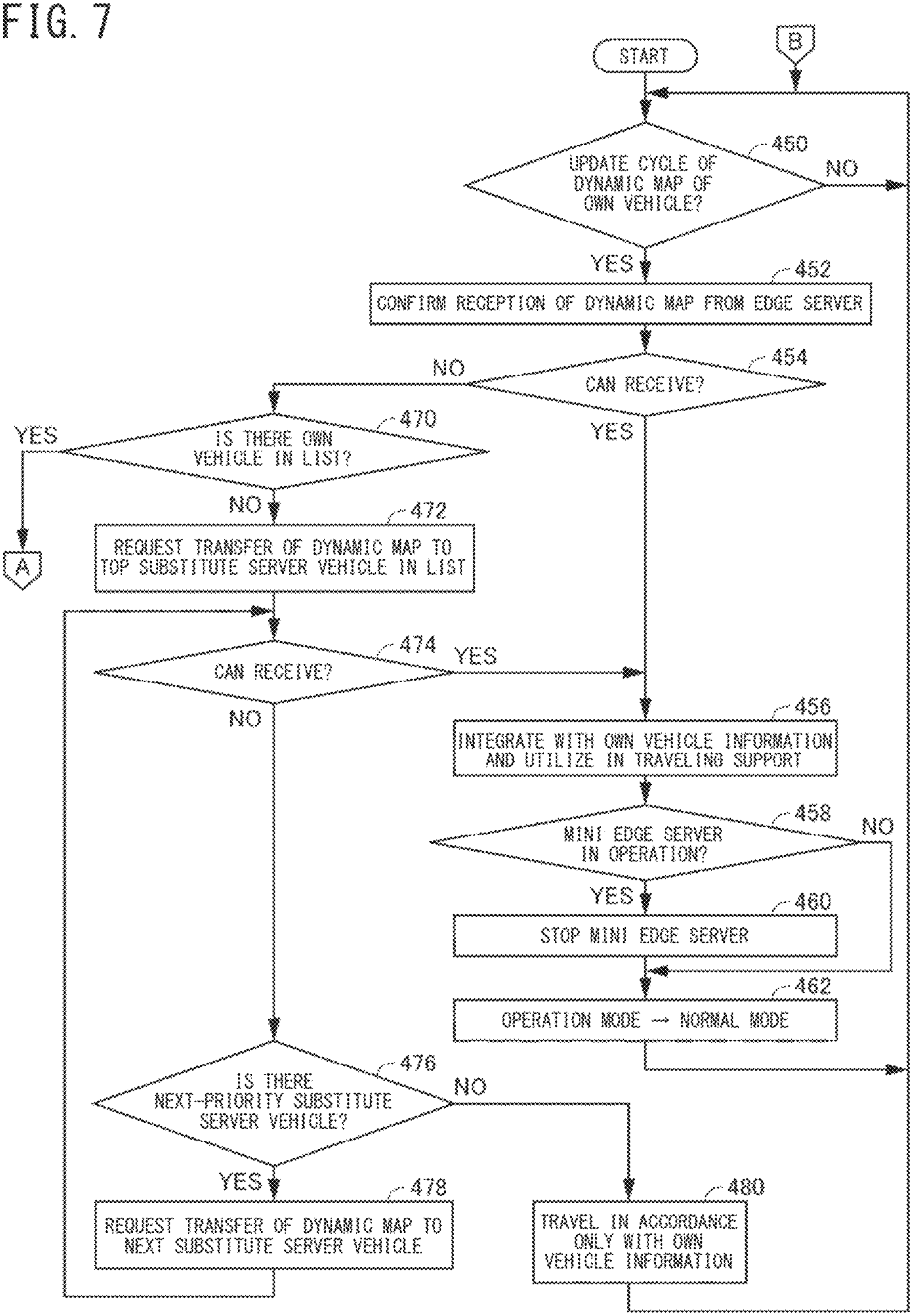
FIG. 7 is a flowchart of a program executed by the in-vehicle device shown in FIG. 1.

A program that realizes the in-vehicle device 90 has a control structure as below. With reference to FIG. 7, this program includes: step 450 of standing by until arrival of the update cycle of the dynamic map of the own vehicle; step 452 of confirming, in response to arrival of the update cycle of the dynamic map, whether or not the dynamic map can be received from the edge server 62, and step 454 of branching the flow of the control in accordance with whether or not the dynamic map has been able to be received.

This program further includes step 456 of integrating, in response to the determination in step 454 being positive, the dynamic map received in step 452 and information held by the own vehicle with each other to utilize the resultant dynamic map in traveling support; and step 458 of determining whether or not the mini edge server 188 is in operation, and branching the flow of the control in accordance with the determination result. This program further includes: step 460 of stopping the mini edge server 188 in response to the determination in step 458 being positive; and step 462 of, when the determination in step 458 is negative, and after completion of step 460 following the determination in step 458 being positive, setting the operation mode of the vehicle 60 to the normal mode and returning the control to step 450. It should be noted that when the dynamic map has been able to be received in step 452, the substitute server vehicle list added to the dynamic map is extracted and stored into a predetermined storage device.

This program further includes: step 470 of determining, in response to the determination in step 454 being negative, whether or not the own vehicle is listed in the substitute server vehicle list held by the own vehicle, and branching the flow of the control in accordance with the determination result; and step 472 of transmitting, in response to the determination in step 470 being negative, a distribution request for dynamic map to a substitute server vehicle (the vehicle having the highest priority as the substitute server) at the top of the list. This program further includes: step 474 of determining whether or not the dynamic map has been able to be received, and branching the flow of the control in accordance with the determination result; step 476 of branching, in response to the determination in step 474 being negative, the flow of the control in accordance with whether or not there is a vehicle that is the next-priority substitute server vehicle listed in the substitute server vehicle list and to which the distribution request for dynamic map has not been transmitted yet; and step 478 of transmitting, in response to the determination in step 476 being positive, the distribution request for dynamic map to the vehicle, and returning the control to step 474.

When the determination in step 474 is positive, the dynamic map has been able to be received. Thus, the control proceeds to step 456, integrates the information possessed by the own vehicle and this dynamic map with each other, and utilizes the resultant dynamic map in traveling support. The process thereafter is the same as that when the determination in step 454 is positive.

When the determination in step 476 is negative, it means that the substitute server vehicle is not present any more. Therefore, the control proceeds to step 480, and operation of the vehicle is performed in accordance only with the information held by the own vehicle. Then, the control returns to step 450. In such a case, it is desirable to notify the driver that the driving support information cannot be acquired.

Figure 8:
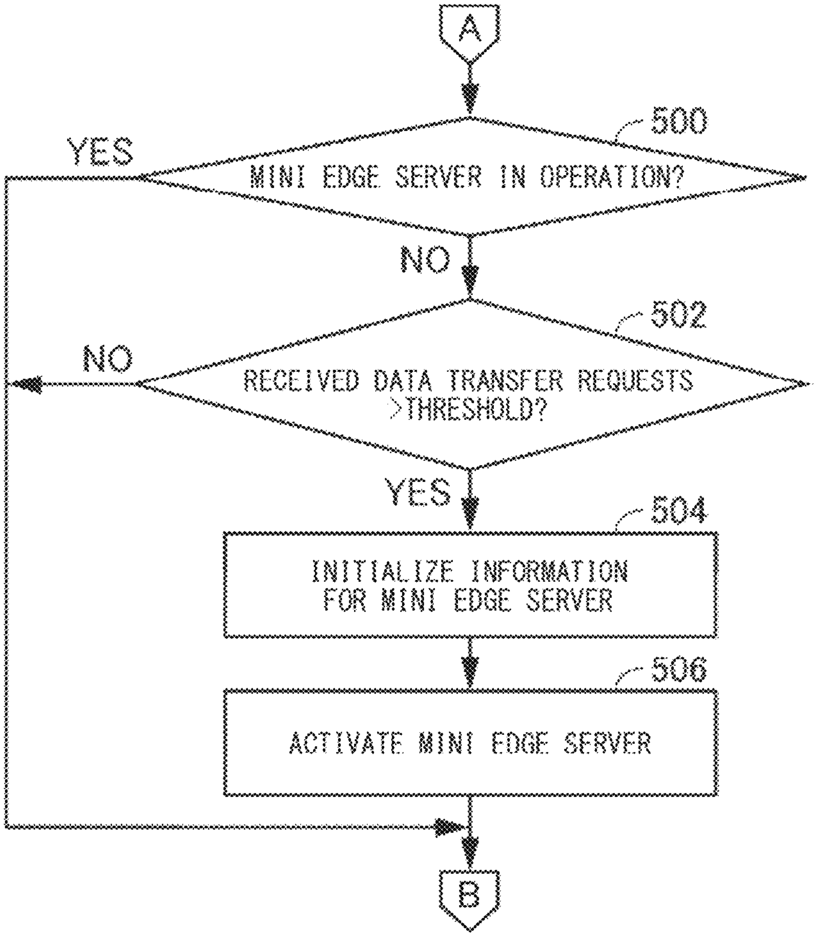
FIG. 8 is a flowchart of a program executed by the in-vehicle device shown in FIG. 1.

With reference to FIG. 8, this program further includes: step 500 of branching, in response to the determination in step 470 being positive, the flow of the control in accordance with whether or not the mini edge server 188 is in operation in the own vehicle; and step 502 of branching, in response to the determination in step 500 being negative, the flow of the control in accordance with whether or not the number of the distribution requests for dynamic map received within a predetermined time period from other vehicles exceeds a predetermined threshold. This program further includes: step 504 of executing, in response to the determination in step 502 being positive, initialization for causing the mini edge server 188 to operate; and step 506 of activating the mini edge server 188 after completion of the process in step 504, and returning the control to step 450 in FIG. 7.

When the determination in step 500 is positive, and when the determination in step 502 is negative, the control returns to step 450 in FIG. 7 without executing step 504 and step 506.

(III) Mini Edge Server Initialization Unit 190

Figure 9:
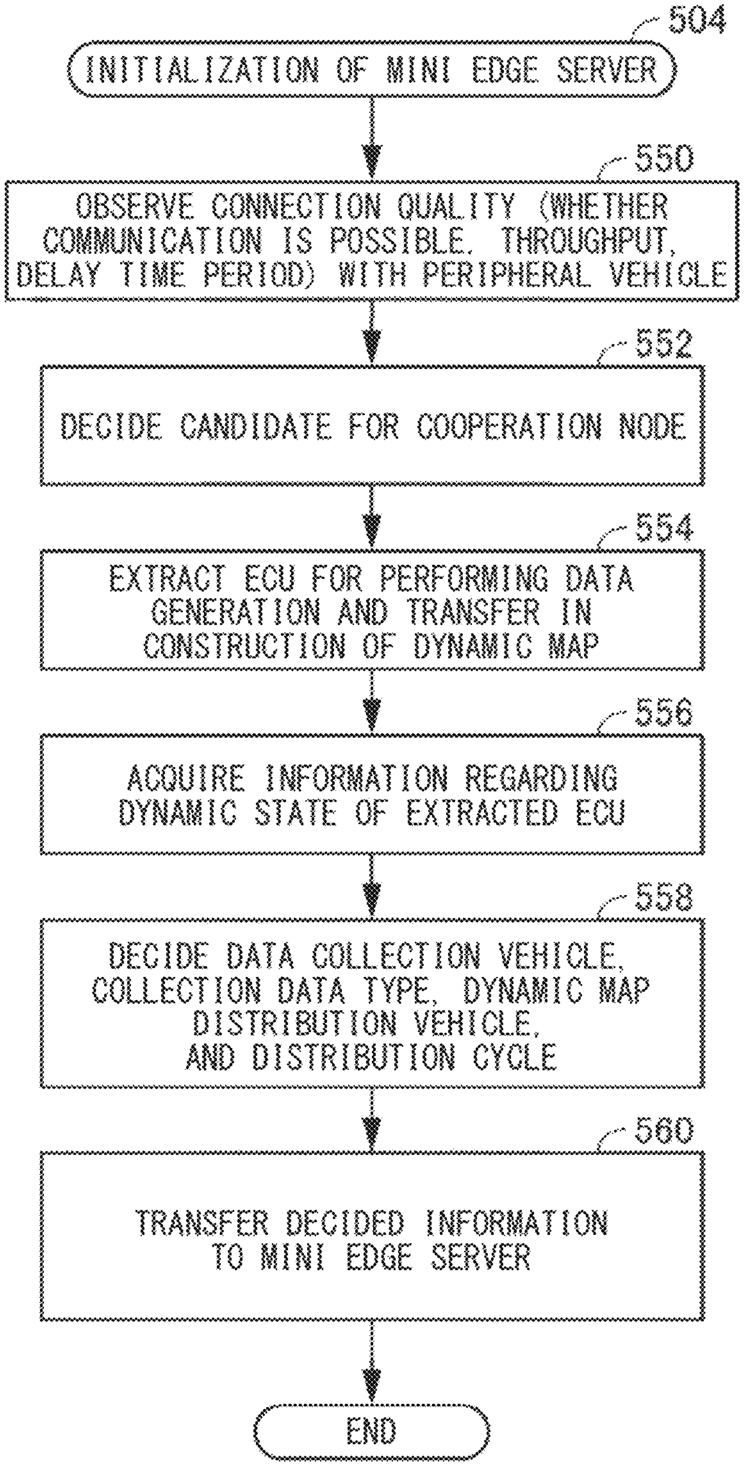
FIG. 9 is a flowchart of a program realizing the mini edge server initialization unit shown in FIG. 2 and FIG. 4.

Step 504 in FIG. 8 corresponds to the process performed by the mini edge server initialization unit 190 in FIG. 4. With reference to FIG. 9, a program that realizes the mini edge server initialization unit 190 includes step 550 of observing the connection quality with peripheral vehicles. An index for measuring the connection quality here includes whether or not communication is possible in the first place, a throughput when the communication is possible, a delay time period of communication, and the like.

This program further includes, after step 550, step 552 of deciding a predetermined number of candidates for the cooperation node by selecting, out of peripheral vehicles, those having a high static specification (so-called specs). This program further includes: step 554 of extracting ECUs, based on the specifications thereof, that perform actual data generation and data transfer in the own vehicle in construction of a dynamic map; and step 556 of acquiring information regarding the current dynamic states of the ECUs extracted in step 554. This program further includes step 558 of deciding, from the vehicles selected in step 552, data collection vehicles according to the information amount that can be processed in the own vehicle, a collection data type, distribution vehicles to which the dynamic map is distributed, and a distribution cycle. The decision in step 558 is performed based on the dynamic states acquired in step 556. This program further includes step 560 of transferring the decided information to the mini edge server 188 and ending this process. The dynamic states collected here include the operation load of a CPU (Central Processing Unit) of the ECU, use status of a memory, communication delay, and the like.

(IV) Distribution Request Reception Process

Figure 10:
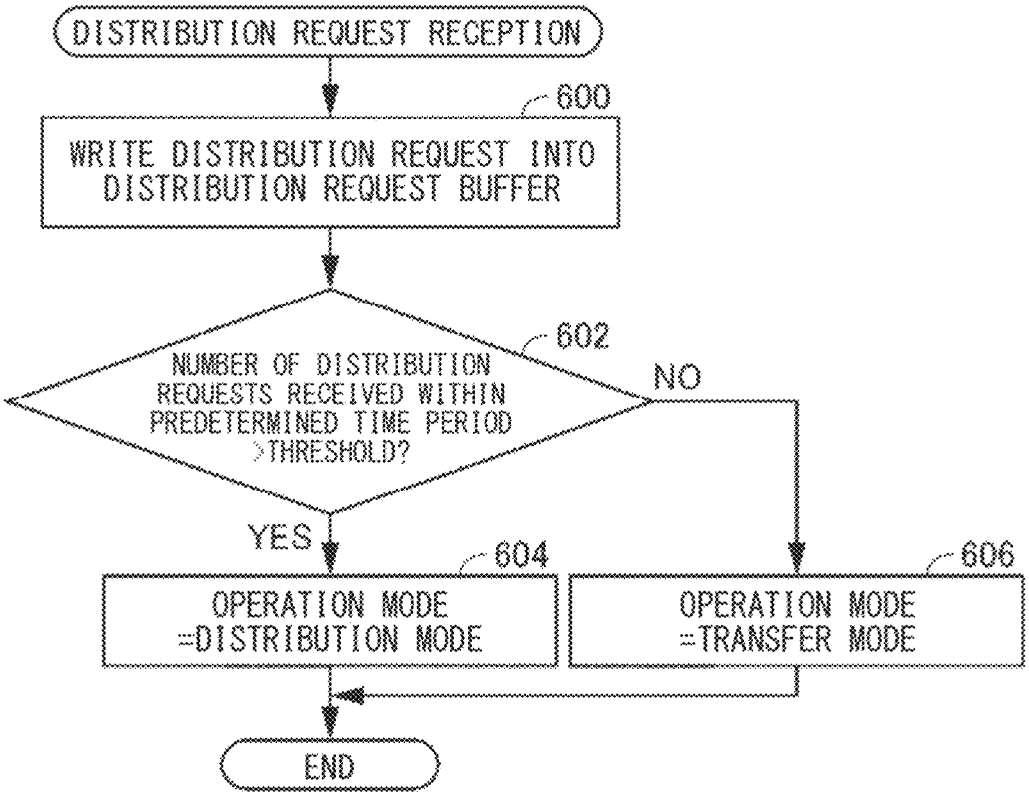
FIG. 10 is a flowchart of a program executed by a collaboration control ECU (Electronic Control Unit) shown in FIG. 1.

With respect to the vehicle 60, in the communication state detection unit 180 shown in FIG. 2, separately from the process described above, a process described below operates upon receiving a distribution (transfer) request from another vehicle. With reference to FIG. 10, this distribution request reception program includes step 600 of writing the distribution request having been received, into the distribution request buffer 184 shown in FIG. 2; and step 602 of branching the flow of the control in accordance with whether or not the number of the distribution requests received within a most recent predetermined time period exceeds a predetermined threshold. This program further includes: step 604 of setting, in response to the determination in step 602 being positive, the operation mode to the distribution mode and ending the execution of this program; and step 606 of setting, in response to the determination in step 602 being negative, the operation mode to the transfer mode, and ending the execution of this program.

It should be noted that when the vehicle is not listed in the substitute server vehicle list, no such distribution request should be received. Therefore, in that case, this program is not activated. Alternatively, a step of performing determination as to whether or not the own vehicle is listed in the substitute server vehicle list may be provided after activation and before step 600, and if the determination is negative, the execution of this program may be ended immediately.

(V) Distribution Process

Figure 11:
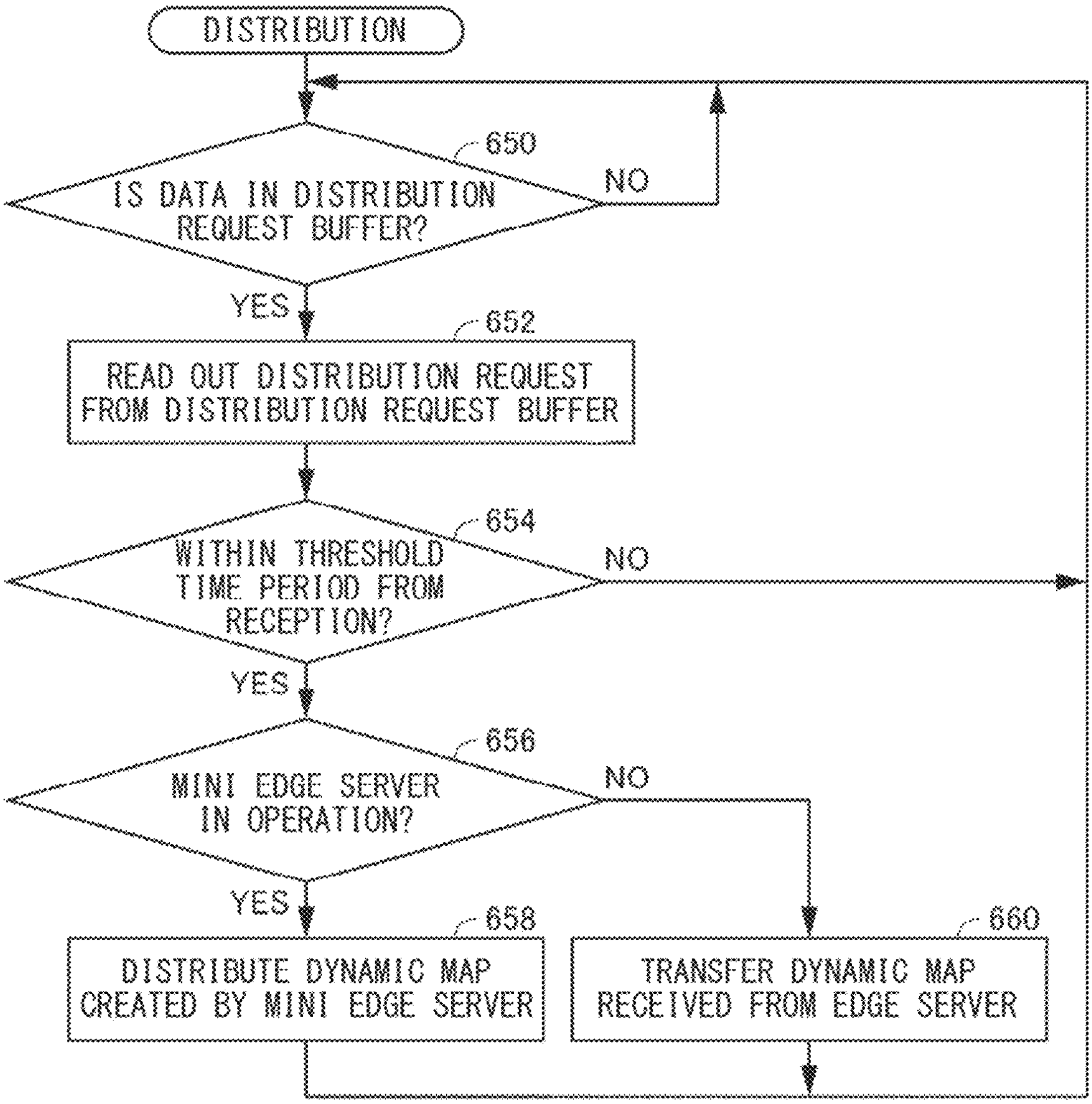
FIG. 11 is a flowchart of a program executed by a transfer unit shown in FIG. 2.

In FIG. 10, when the distribution mode has been set in step 604, and when the transfer mode has been set in step 606, the following distribution program is executed by the transfer unit 186 shown in FIG. 2. With reference to FIG. 11, this program includes: step 650 of standing by until a distribution request is stored into the distribution request buffer 184; and step 652 of reading out, in response to determination that the distribution request is stored in the distribution request buffer 184 in step 650, the distribution request from the distribution request buffer 184. This program further includes, following step 652, step 654 of branching the flow of the control in accordance with whether or not the elapsed time period from the time at which the distribution request has been received to the time (current time) at which the distribution request is read out is within a predetermined threshold time period.

This program further includes: step 656 of branching, in response to the determination in step 654 being positive, the flow of the control in accordance with whether or not the mini edge server 188 is in operation; and step 658 of reading out, in response to the determination in step 656 being positive, the dynamic map created by the mini edge server 188 from the mini edge server output storage 192 in FIG. 2, distributing the dynamic map to the vehicle that has transmitted the distribution request, and returning the control to step 650. This program further includes step 660 of transferring, in response to the determination in step 656 being negative, the dynamic map stored in the driving support information storage 156 to the transmission source of the distribution request, and returning the control to step 650. The dynamic map is one that has been received from the edge server 62 by the external communication device 154 and has been stored in the driving support information storage 156 via the vehicle inside-outside collaboration unit 152.

In this example, during the distribution mode, separately from this process, the transfer unit 186 periodically transfers the dynamic map stored in the mini edge server output storage 192 also to the vehicle inside-outside collaboration unit 152 through the selection unit 158. Based on this dynamic map, the vehicle inside-outside collaboration unit 152 operates in the same manner as in the normal mode, and performs traveling support.

(VI) Mini Edge Server 188

Figure 12:
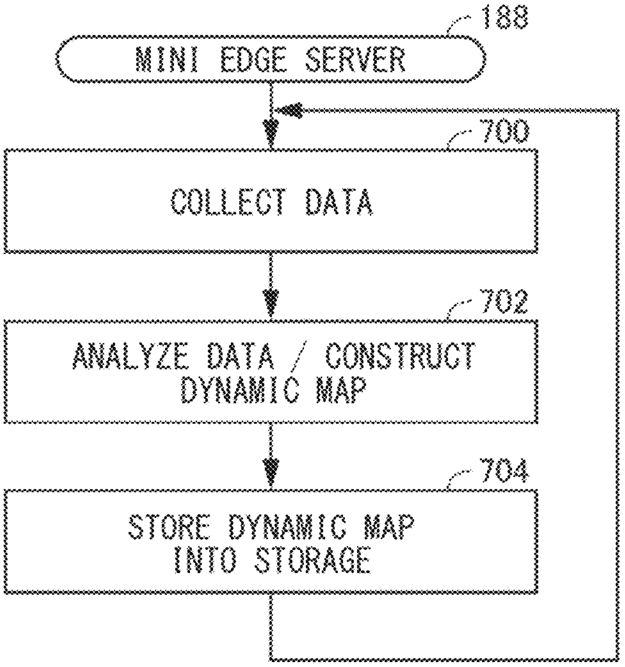
FIG. 12 is a flowchart of a program realizing the mini edge server shown in FIG. 2 and FIG. 3.

A program that realizes the mini edge server 188 has a control structure as below. With reference to FIG. 12, this program includes: step 700 of collecting sensor data from sensors of peripheral vehicles decided to be the data collection vehicles and the own vehicle: step 702 of analyzing the sensor data collected in step 700 and constructing a dynamic map; and step 704 of storing the dynamic map constructed in step 702 into the mini edge server output storage 192 shown in FIG. 2, and returning the control to step 700.

The mini edge server 188 periodically executes this program, during operation of the mini edge server 188. In order to end the process of the mini edge server 188, an instruction to end the execution of the program is directly issued to an arithmetic processing device.

(VII) State Update Process

The substitute server vehicle is selected mainly based on the specs of the vehicle and the dynamic state of hardware of the in-vehicle device at the time of determination. The specs are static information, whereas the dynamic state, literally, always changes. Therefore, even when a vehicle has sufficient performance and room for the dynamic state as the substitute server vehicle at the time of selection of the substitute server vehicle, the dynamic state may change in association with change in the traffic situation or execution of some process in the vehicle. Depending on this change, the condition of having sufficient performance and dynamic state as the substitute server vehicle may become no longer satisfied.

In this embodiment, in such a case, the vehicle notifies the edge server 62 of the state change of the vehicle. In the collaboration control ECU 94, a program for this purpose is periodically operating.

Figure 13:
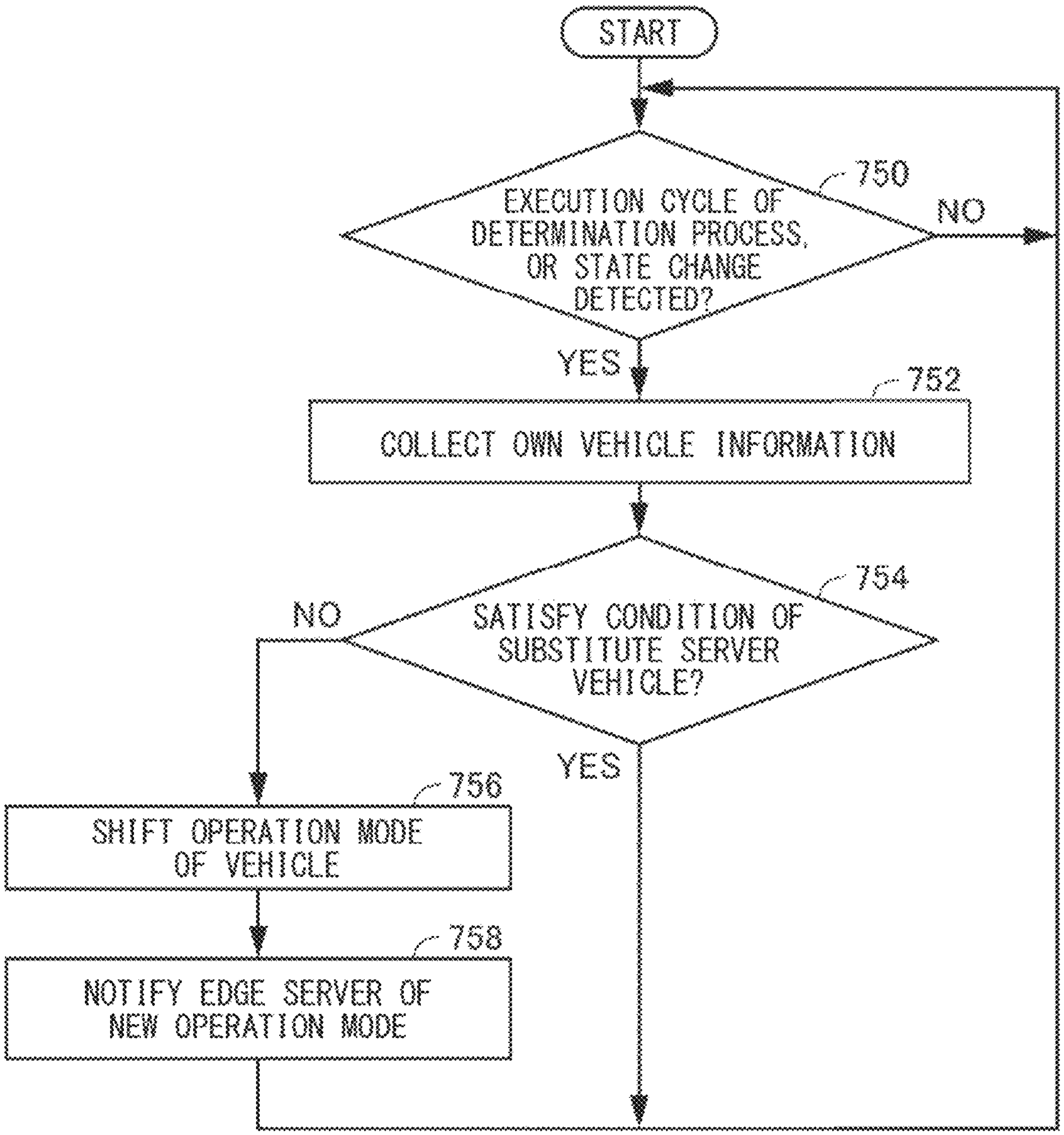
FIG. 13 is a flowchart of a program executed by the collaboration control ECU shown in FIG. 1.

With reference to FIG. 13, this program includes step 750 of standing by until arrival of the execution cycle of a determination process, or until detection of the fact that there is some state change in the in-vehicle device and each in-vehicle ECU, etc. This program further includes: step 752 of collecting, in response to the standing by having ended in step 750, information of the own vehicle, i.e., the dynamic state; and step 754 of branching the flow of the control in accordance with whether or not the own vehicle satisfies the condition as the substitute server vehicle, based on the information regarding the dynamic state collected in step 752. This program further includes: step 756 of shifting, in response to the determination in step 754 being negative, the operation mode of the vehicle to an operation mode in which the load is low; and step 758 of notifying the edge server 62 of the new operation mode and returning the control to step 750. When the determination in in step 754 is positive, the control immediately returns to step 750.

2. Operation

Each component of the driving support system 50 having the configuration as described above operates as follows.

(1) Edge Server 62

With reference to FIG. 5, in the edge server 62, the communication device 350) performs communication with the outside, and a process of appropriately assigning data received by the communication device 350 in accordance with the content of the data is performed. That is, the communication device 350 provides sensor data from the data collection vehicles and the infrastructure sensors to the dynamic map creation unit 362 and provides the vehicle information from each vehicle in the management region to the vehicle management unit 354.

The dynamic map creation unit 362 creates a dynamic map in a certain cycle by analyzing the received data, and stores the dynamic map into the dynamic map storage 364. As a result of this, the dynamic map is updated to the newest map in the certain cycle.

The vehicle management unit 354 updates the database of vehicles forming the vehicle information storage 356, based on the vehicle information from vehicles in the region managed by the edge server 62. As a result of this, the vehicle information stored in the vehicle information storage 356 is updated to the newest one in a certain cycle.

The substitute server vehicle list creation unit 358 periodically creates a substitute server vehicle list, based on the vehicle information stored in the vehicle information storage 356. For this creation, the specs of each vehicle and the dynamic state of each vehicle are used. When the operation mode of the vehicle has been changed due to the dynamic state as well, the vehicle information in the vehicle information storage 356 is updated, and the updated vehicle information is taken into consideration in the creation of the substitute server vehicle list. The substitute server vehicle list storage 360 stores the substitute server vehicle list created by the substitute server vehicle list creation unit 358.

Specifically, with reference to FIG. 6, in this process, first, an instruction to determine whether or not serving as the substitute server vehicle is possible is transmitted to each vehicle in the region managed by the edge server 62 (step 402), and a response thereto is received (step 406). Based on data obtained as a result of this, in step 408, with respect to each intersection region, a substitute server vehicle list of the intersection region is decided (step 420), and the substitute server vehicle list is stored into the substitute server vehicle list storage 360 shown in FIG. 5 (step 422).

With reference to FIG. 5 again, the substitute server vehicle list addition unit 366 periodically reads out the dynamic map stored in the dynamic map storage 364, and adds, to the dynamic map, the substitute server vehicle list stored in the substitute server vehicle list storage 360, and provides the resultant dynamic map to the transmission unit 368. The transmission unit 368 periodically transmits, through the communication device 350, the dynamic map having added thereto the substitute server vehicle list by the substitute server vehicle list addition unit 366, to the transmission destination vehicle determined based on the vehicle information stored in the vehicle information storage 356.

(2) Vehicle 60

The vehicle 60 operates as follows.

(I) Normal Mode

With reference to FIG. 2, in the normal mode, the collaboration operation decision unit 182 of the in-vehicle device 90 controls the selection unit 158 such that the vehicle inside-outside collaboration unit 152 receives data from the external communication device 154 and data from the vehicle inside-outside collaboration unit 152 is transmitted to the edge server 62 through the external communication device 154. The mini edge server 188 does not operate.

More specifically, with reference to FIG. 7, upon arrival of the update cycle of the dynamic map in step 450, a dynamic map is received from the edge server 62 in step 452. Normally, the reception of the dynamic map succeeds. Therefore, in step 454, the determination becomes positive, and in step 456, information possessed by the own vehicle and the received dynamic map are integrated with each other, to be utilized in traveling support. The determination in step 458 becomes negative, and the control returns to step 450. At this time, the substitute server vehicle list added to the dynamic map is separated and stored into a predetermined storage device.

In parallel to this, the vehicle inside-outside collaboration unit 152 receives information from each sensor mounted to the vehicle through the in-vehicle gateway 150, and periodically transmits the information to the edge server 62 through the external communication device 154.

(II) Transfer Mode

The condition for entering the transfer mode is receiving a distribution request for dynamic map from another vehicle in the normal mode. Upon reception of the distribution request, the communication state detection unit 180 shown in FIG. 2 detects the reception, and stores the distribution request into the distribution request buffer 184. As a result of this, the vehicle 60 enters the transfer mode. In the description below, two cases, i.e., a case where the vehicle 60 is listed in the substitute server vehicle list, and a case where the vehicle 60 is not listed therein, will be described.

(i) A Case where the Vehicle 60 is not Listed in the Substitute Server Vehicle List In this case, originally, no distribution request from another vehicle should arrive at the vehicle 60. Therefore, as described in the description regarding FIG. 10, the distribution request is ignored.

In this case, conversely, when only the vehicle 60 cannot communicate with the edge server 62, through the route of step 452, step 454, step 470, and step 472 shown in FIG. 7, the already received substitute server vehicle list is referred to, and data from an appropriate vehicle is received.

(ii) A Case where the Vehicle 60 is Listed in the Substitute Server Vehicle List In this case, a distribution request from another vehicle may arrive at the vehicle 60. However, also in this case, there are two possibilities. The first case is a case where the edge server 62 is normally operating but some vehicles cannot communicate with the edge server 62 due to some cause. The second case is a case where the edge server 62 itself has failed. In the following, these will be described in order.

A: First Case

In the first case, it can be assumed that the majority of vehicles including the vehicle 60 are normally communicable with the edge server 62. Therefore, the distribution requests are those from very limited vehicles. In such a case, the number of the distribution requests received by the vehicle 60 within a predetermined time period should be very small. Therefore, the determination in step 602 shown in FIG. 10 becomes negative, and the vehicle 60 enters the transfer mode.

At this time, the process shown in FIG. 7 is executed in the same manner as in the normal mode.

Meanwhile, in the distribution process in FIG. 11 that is periodically executed, the processes of step 650, step 652, and step 654 are executed. If it is assumed that the determination in step 654 becomes positive, the determination in step 656 becomes negative (i.e., the operation mode is determined to be the transfer mode), and the dynamic map already received from the edge server 62 and stored in the driving support information storage 156 in FIG. 2 is read out from the driving support information storage 156, and is transferred to the vehicle that has transmitted the distribution request.

B: Second Case

In the second case, none of the peripheral vehicles can communicate with the edge server 62. Therefore, in every vehicle, the processes from step 472 to step 478 in FIG. 7 are executed, and a distribution request is sent to the vehicle 60. That is, in this case, the number of the distribution requests received by the vehicle 60 within a certain time period should become large.

First, in this case, through the route of step 452, step 454, and step 470 in FIG. 7, step 500 shown in FIG. 8 is further executed. Since the mini edge server 188 is not activated immediately after the communication interruption, the determination in step 500 becomes negative, and step 502 is executed. In the condition assumed here, the determination in step 502 becomes positive, step 504 and step 506 are executed, and the mini edge server 188 is activated.

In this case, the process in FIG. 10 is executed in parallel. This process is executed for a plurality of the distribution requests, and all the distribution requests are accumulated in the distribution request buffer 184. At a certain timing, the determination in step 602 becomes positive, the process in step 604 is executed, and the operation mode of the vehicle 60 is set to the distribution mode.

Further, the process in FIG. 11 is also executed in parallel. Normally, the determination in step 650 is negative, and thus, the distribution process is not executed. However, when the edge server 62 has failed, the distribution requests for dynamic map to the vehicle 60 are concentrated. Therefore, the determination in step 650 becomes positive.

The transfer unit 186 reads out the distribution request in order from the distribution request buffer 184. When the condition in step 654 is satisfied, step 656 to step 658 are executed, and the dynamic map generated by the mini edge server 188 is distributed to the transmission source of the distribution request. This process is repeated, and the distribution requests accumulated in the distribution request buffer 184 are processed in order.

When a certain time period or more has elapsed since arrival of the distribution request, the dynamic map generated by the mini edge server 188 may no longer be appropriate. In order to cope with such a problem, step 654 is provided.

When the edge server 62 has been restored to a normal state and the communication between the vehicle 60 and other vehicles, and the edge server 62 has been recovered, the route of step 452, step 454, step 456, step 458, and step 460 in FIG. 7 is executed, and the mini edge server 188 is stopped. In subsequent step 462, the operation mode becomes the normal mode and the vehicle 60 returns to normal operation.

3. Effects

As described above, according to this embodiment, the edge server 62 creates the substitute server vehicle list in advance and distributes the substitute server vehicle list together with the dynamic map to each vehicle. When communication between a certain vehicle and the edge server 62 has been interrupted, the vehicle transmits a distribution request for dynamic map to a vehicle decided in accordance with the substitute server vehicle list. Therefore, as compared with a case where search for the substitute server is started after the communication has been interrupted, each vehicle can acquire the dynamic map earlier. In addition, when a trouble has occurred in the edge server 62 and communication with each vehicle has been interrupted, a vehicle listed in the substitute server vehicle list can quickly start operation as the substitute server, based on the arrival status of the distribution request. There is an effect that: the time period for deciding the substitute server can be shortened; and even when a trouble has occurred in the edge server 62, the influence can be reduced. In a case where a certain vehicle cannot communicate with the edge server 62 due to some cause even when the edge server 62 is normally operating, if distribution of a dynamic map is requested to a vehicle listed in the substitute server vehicle list, the dynamic map can be quickly acquired. When the number of such vehicles is limited, activation of a substitute server (mini server) is not necessary, and necessary information can be provided through a minimum process to a vehicle that needs the information.

II. Second Embodiment

1. Configuration

(1) Management Region

In the first embodiment, for each intersection region managed by the edge server 62, a substitute server vehicle list is created and distributed. Vehicles in the same region uses the same substitute server vehicle list. Vehicles in different regions use substitute server vehicle lists different from each other.

However, depending on the intersection region, there is often a difference in the number of vehicles present therein. In particular, the processing efficiency may be different between an intersection where a large number of vehicles are present and an intersection where the number of vehicles is not so large. That is, in an intersection where a large number of vehicles are present, if a substitute server is caused to operate, the load of the vehicle may become too large, resulting in difficulty in quick distribution of the dynamic map to all the vehicles. Conversely, in an intersection where the number of vehicles is small, there will be many situations where the processing capacity of the vehicle functioning as the substitute server is not sufficiently used.

This may cause a situation where the entire resources of the vehicles managed by the edge server cannot be appropriately and efficiently used.

Thus, in this second embodiment, depending on the number of vehicles present in each intersection region, the intersection region is divided or a plurality of intersection regions are integrated.

(2) Division/Integration of Management Region

Figure 14:
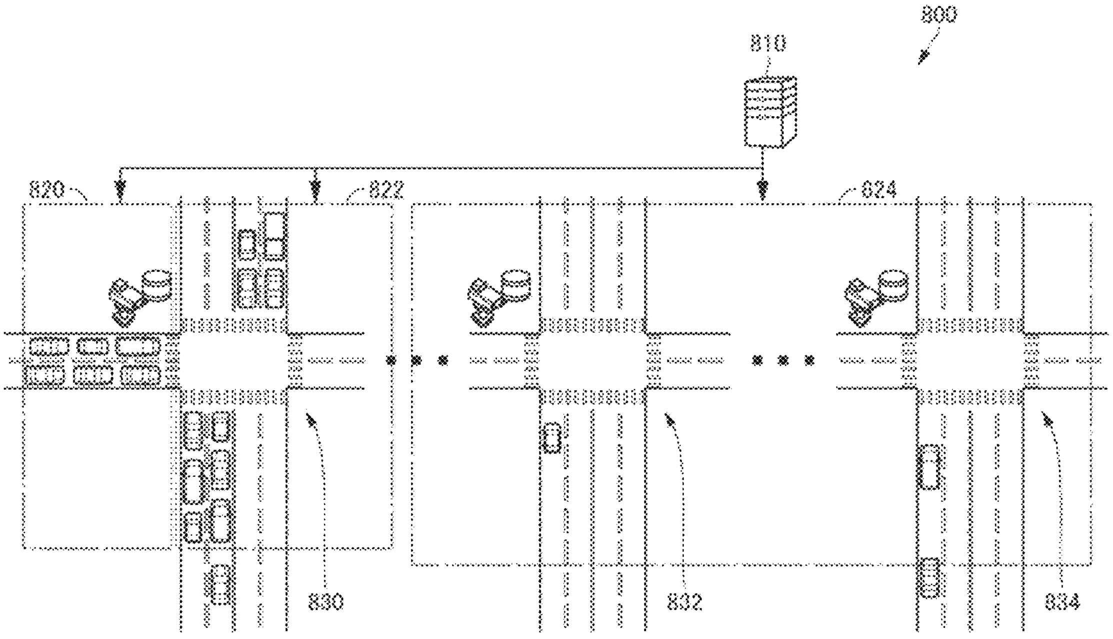
FIG. 14 is a diagram for describing a second embodiment of the present disclosure.

FIG. 14 schematically shows a management region 800 managed by an edge server 810 according to this second embodiment. The management region 800 is divided into a region 820, a region 822, and a region 824. The region 820 is in contact with an intersection 830. The region 822 includes the intersection 830. The region 824 includes both of an intersection 832 and an intersection 834.

Originally, the management region 800 has been divided into a region (the region 820 and the region 822) including the intersection 830, a region including only the intersection 832, and a region including only the intersection 834. However, the reason why the management region 800 is divided as shown in FIG. 14 is that a large number of vehicles are present in the intersection 830 and the periphery thereof, whereas not so many vehicles are present in each of the intersection 832 and the intersection 834. The reason why the region including the intersection 830 is divided into the region 820 and the region 822 is that the number of vehicles are large. In order to cause the number of vehicles to be equal as much as possible, the region including the intersection 830 is divided into the region 820 and the region 822. Such division and integration of the region is dynamically performed in accordance with the number of vehicles present in the vicinity of each intersection.

Figure 15:
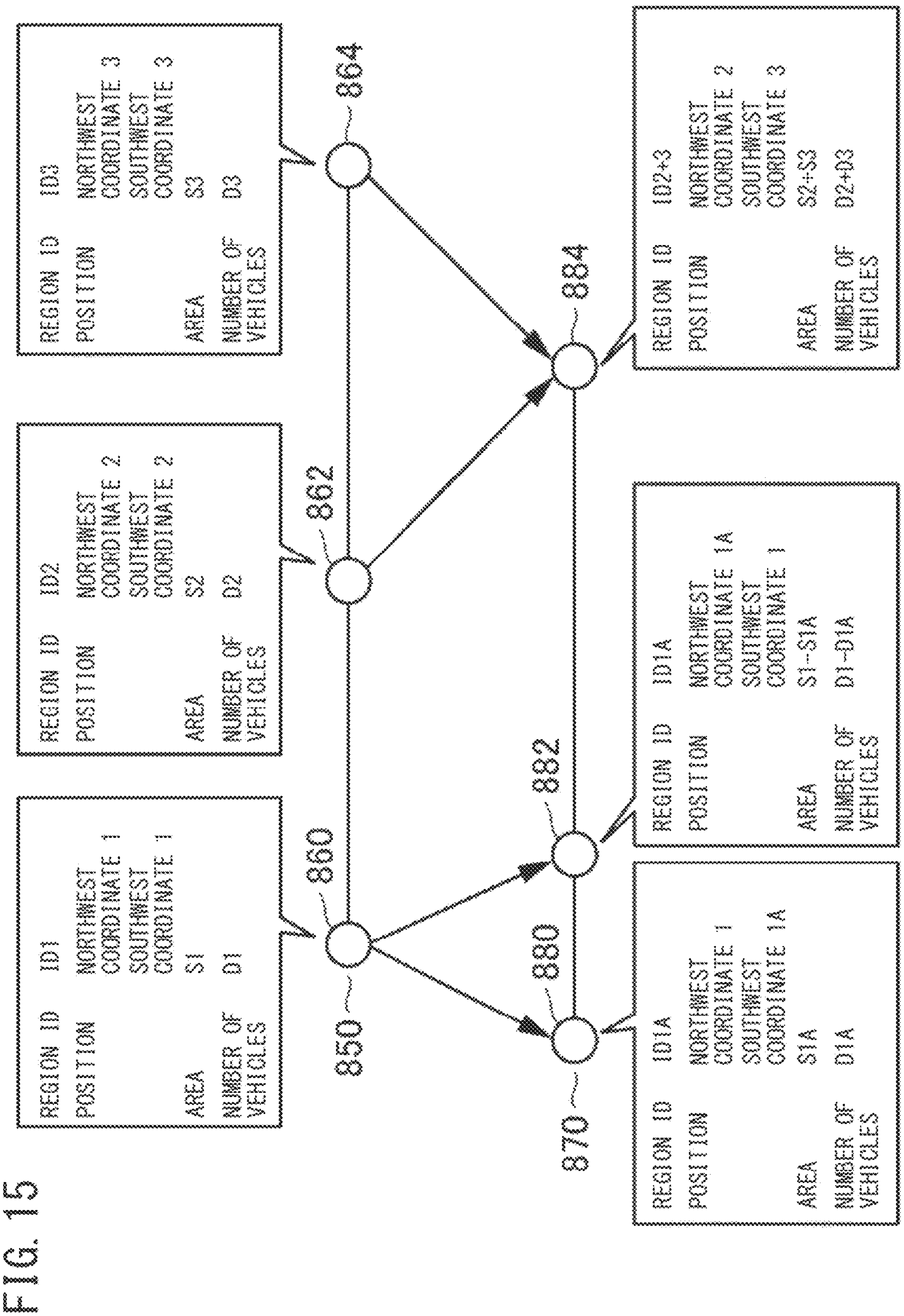
FIG. 15 shows a graph for deciding a target region in the second embodiment.

In order to integrate or divide a region like this, it is convenient to use a so-called graph theory. With reference to FIG. 15, when the regions including the intersection 830, the intersection 832, and the intersection 834 in FIG. 14 are respectively separately provided, the relationship between these regions is represented by a graph 850.

The graph 850 includes: a node 860 corresponding to the region including the intersection 830; a node 862 corresponding to the region including the intersection 832; and a node 864 corresponding to the region including the intersection 834. That the intersection 830 and the intersection 832 are connected by a road and that the intersection 832 and the intersection 834 are also connected by a road are represented by an edge connecting the node 860 and the node 862 and an edge connecting the node 862 and the node 864. When no edge is present between two nodes, the two nodes cannot be directly integrated. For example, no edge is present between the node 860 and the node 864. This indicates that the region including the intersection 830 and the region including the intersection 834 cannot be integrated with each other without including the region including the intersection 832.

As node information, each node has an identifier (node ID) of the node, coordinates that define the region corresponding to the node, the area thereof, and the number of vehicles present in the region.

When the regions divided in this manner are represented by a graph, it is easy to perform determination that, for example, if the number of vehicles at the node 860 is larger than a threshold, the region is divided into two or more. Such a process corresponds to dividing the node 860 into two nodes, i.e., a node 880 and a node 882, connected to each other by a new edge. When the total number of vehicles at two nodes adjacent to each other is equal to or less than a threshold, these two nodes can be integrated to be a new node 884. In this case, edges other than the edge connecting the node 862 and the node 864 may be connected to the node 884. In this manner, a new graph 870 is obtained.

(3) Edge Server

Figure 16:
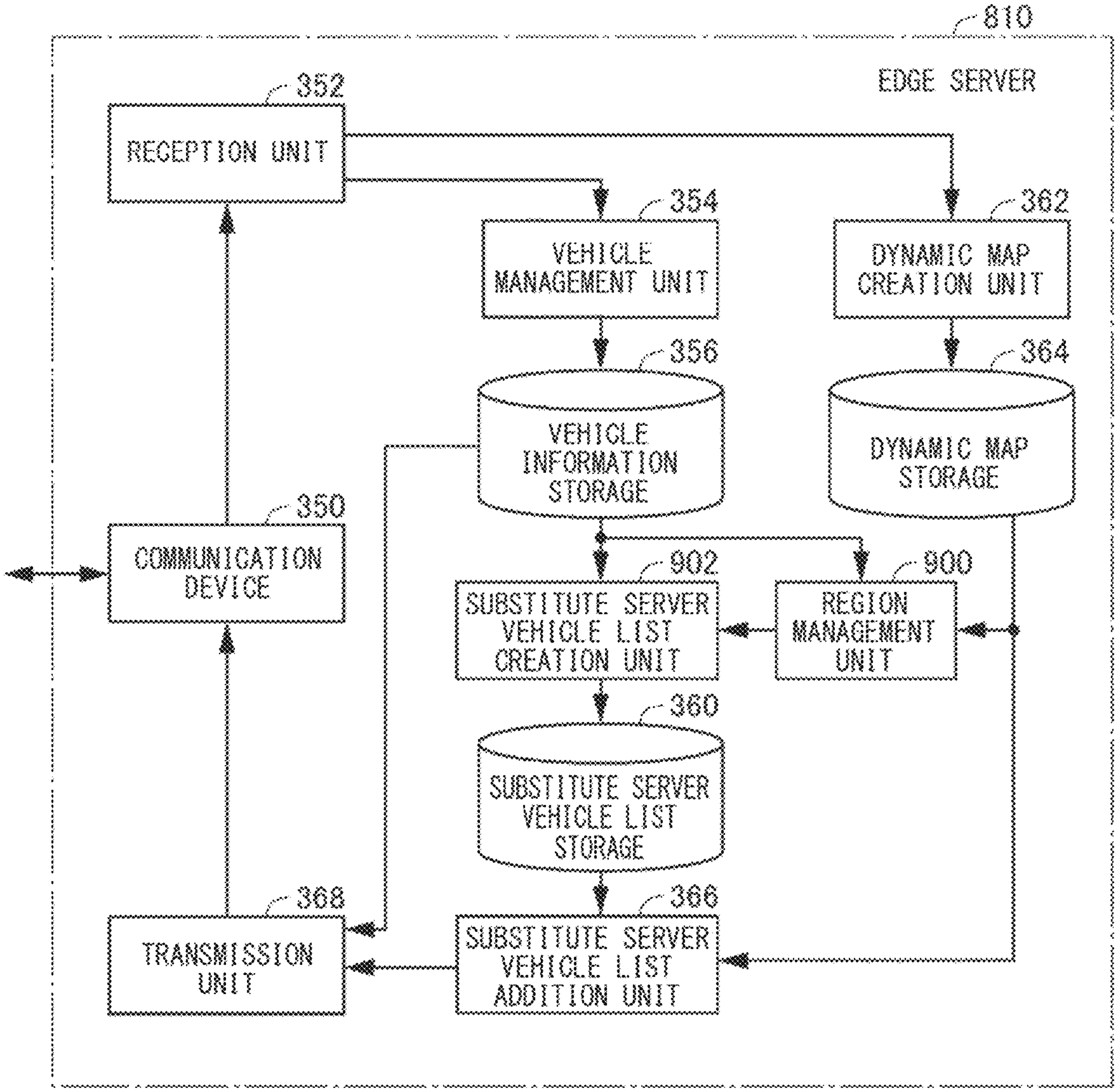
FIG. 16 is a block diagram showing a functional configuration of an edge server in the second embodiment.

FIG. 16 shows a configuration of the edge server 810 according to the second embodiment. Differences of the edge server 810 shown in FIG. 16 from the edge server 62 according to the first embodiment shown in FIG. 5 are: further including a region management unit 900 which manages the management region of the edge server 810 so as to be divided/integrated according to the method described above; and including, in place of the substitute server vehicle list creation unit 358 shown in FIG. 5, a substitute server vehicle list creation unit 902 which creates a substitute server vehicle list separately for each division region that is divided/integrated. Other than this, the edge server 810 has the same configuration as that of the edge server 62.

(4) Program Configuration

Figure 17:
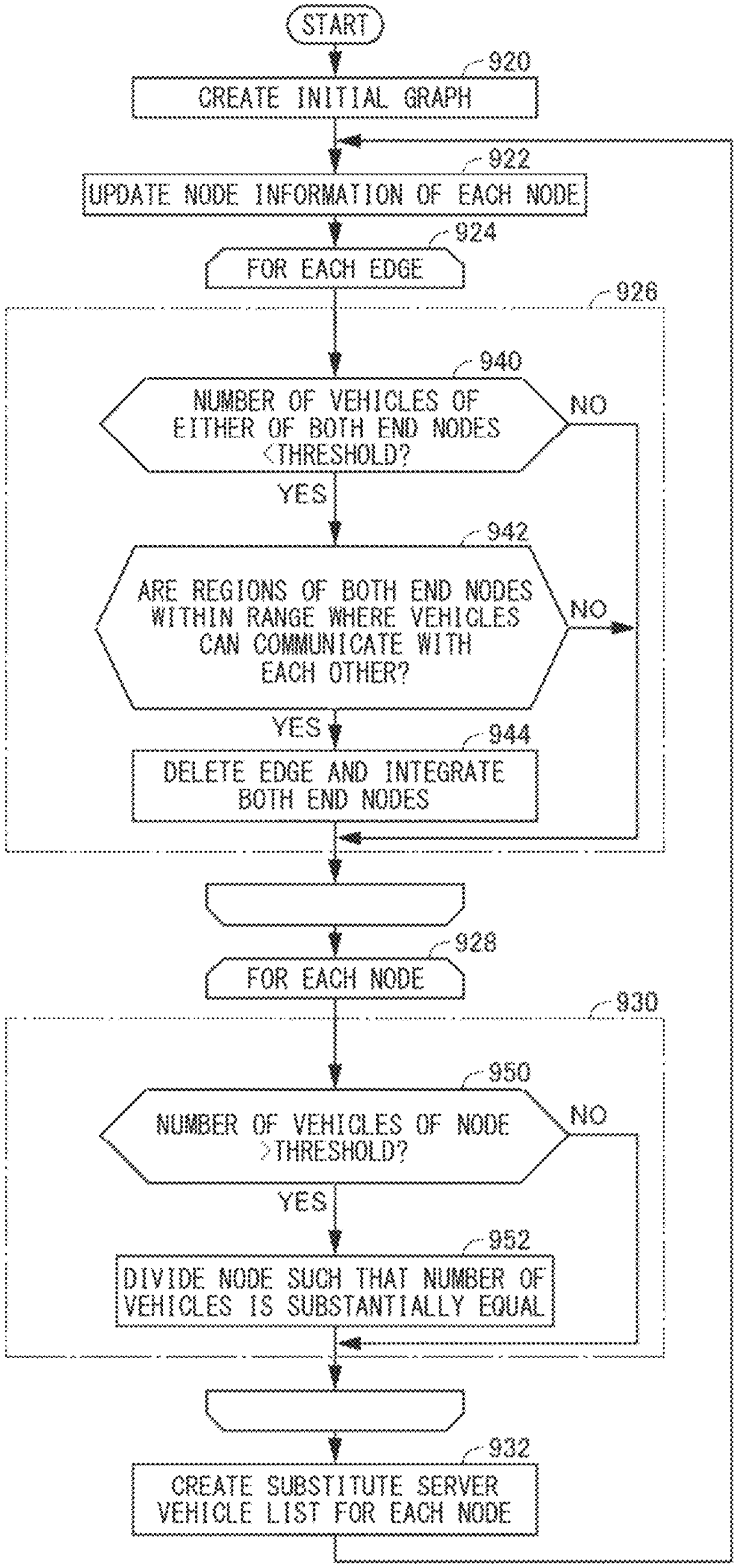
FIG. 17 is a flowchart of a program executed by the edge server in the second embodiment.

FIG. 17 shows a control structure of a program that realizes the function of the region management unit 900 described above. With reference to FIG. 17, this program includes: step 920 of creating an initial graph in accordance with initial information prepared in advance; and step 922 of, for each node in the graph created in step 920, updating the corresponding node information by collecting information from the corresponding region. This program further includes: step 924 of executing below-described step 926 for each edge in the graph for which the node information has been updated in step 922: step 928 of, after step 924, executing below-described step 930 for each node; and step 932 of, after completion of the process in step 928, creating a substitute server vehicle list for each node and returning the control to step 922.

Step 926 includes: step 940 of branching the flow of the control in accordance with whether or not the number of vehicles at either of both end nodes of the target edge is smaller than a threshold; and step 942 of branching, in response to the determination in step 940 being positive, the flow of the control in accordance with whether or not the regions of both end nodes are within a range where vehicles present therein can communicate with each other. Step 926 further includes step 944 of deleting, in response to the determination in step 942 being positive, the target edge, integrating both end nodes, and ending step 926. When the determination in step 940 is negative, and when the determination in step 942 is negative, step 926 ends without performing integration of nodes.

Step 930 includes: step 950 of determining whether or not the number of vehicles at the target node exceeds a threshold and branching the flow of the control in accordance with the determination; and step 952 of dividing, when the determination in step 950 is positive, the node such that the numbers of vehicles become substantially equal, providing a new edge between the nodes, and ending step 930. When the determination in step 950 is negative, step 930 ends without performing division of the node.

2. Operation

As is clear from the description above and the description in FIG. 17, in this second embodiment, a division region in the region managed by the edge server 810 is dynamically divided further into two division regions, or two division regions are dynamically integrated. Through repetition of this process, a plurality of division regions are dynamically integrated into one division region, or one division region is divided into a plurality of division regions. Although the division region as the target is dynamically changed, the distribution process of the dynamic map and the creation process of the substitute server vehicle list in each division region, which are performed by the edge server 810, are similar to those in the first embodiment.

3. Effects

As described above, according to this second embodiment, the number of vehicles in each division region can be leveled. Even when the edge server 810 cannot distribute the dynamic map due to some cause, the substitute server vehicle list has been distributed in advance, and thus, distribution of a dynamic map by the substitute server vehicle in each division region can be quickly started. In addition, a situation where an excessive load is applied to some substitute server vehicles can be prevented.

III. Hardware Configuration

The edge server 62 of the first embodiment and the edge server 810 of the second embodiment must have a communication function, but, other than this, can be realized by ordinary computer hardware. In addition, for example, the in-vehicle device 90 and the collaboration control ECU 94 of the vehicle 60 can be realized by an information processing device composed of a processor and the like that is usually used.

Figure 18:
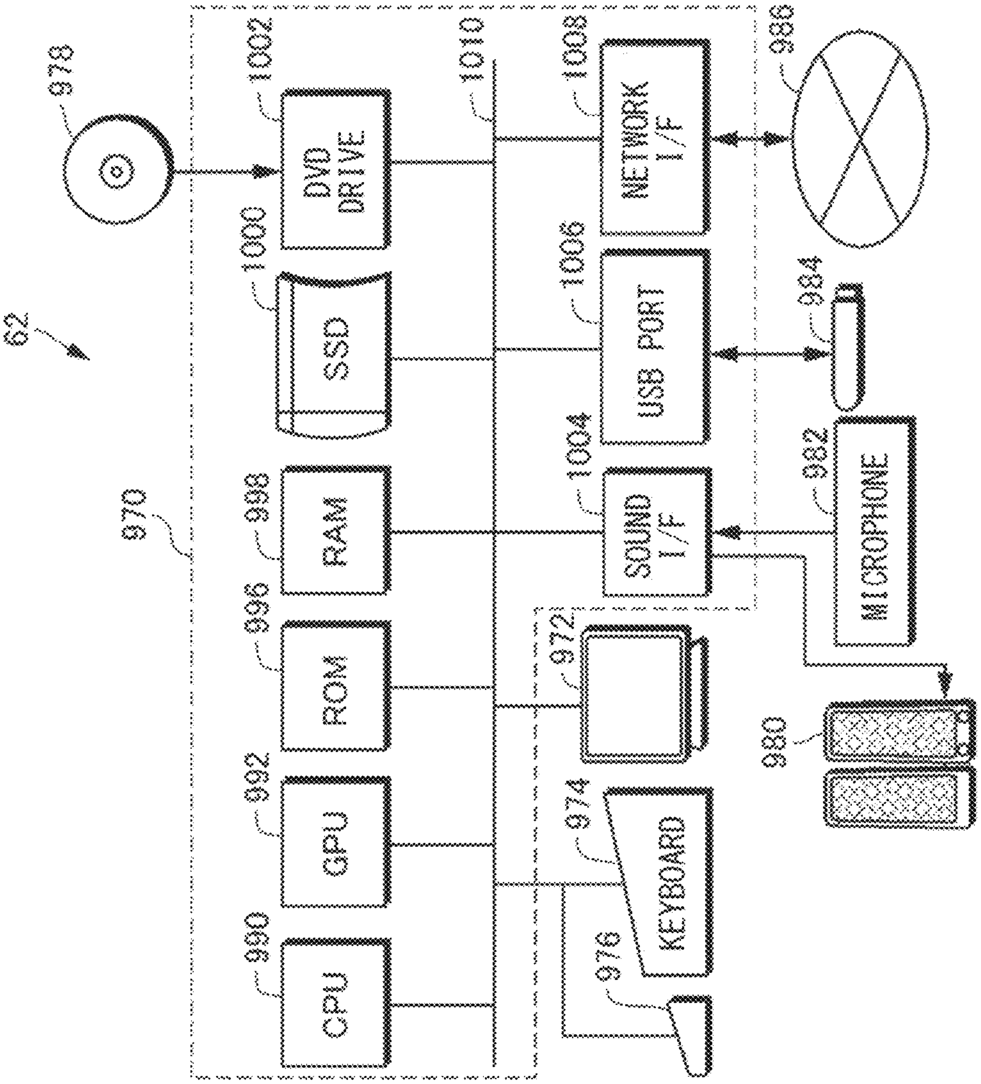
FIG. 18 is a block diagram showing a hardware configuration of the edge server in the first embodiment and the second embodiment.

FIG. 18 shows a hardware block diagram of a computer for realizing the edge server 62, for example. The configuration of the edge server 810 is the same.

FIG. 18 is a hardware block diagram of a computer system realizing each embodiment described above.

With reference to FIG. 18, the edge server 62 includes: a computer 970 having a DVD (Digital Versatile Disc) drive 1002; and a keyboard 974, a mouse 976, and a monitor 972, which are each connected to the computer 970 and which are for having a dialogue with a user. It is understood that these are examples of a configuration for a case where a user dialogue is necessary, and any general hardware and software (e.g., a touch panel, a sound input, a pointing device in general) that can be used for user dialogue can be used.

In addition to the DVD drive 1002, the computer 970 includes a CPU 990, a GPU (Graphics Processing Unit) 992, and a bus 1010 connected to the CPU 990, the GPU 992, and the DVD drive 1002. The computer 970 further includes: a ROM (Read-Only Memory) 996 connected to the bus 1010 and storing a boot up program and the like of the computer 970; and a RAM (Random Access Memory) 998 connected to the bus 1010 and storing commands forming a program, a system program, work data, and the like. The computer 970 further includes an SSD (Solid State Drive) 1000 which is a non-volatile memory connected to the bus 1010. The SSD 1000 is for storing programs executed by the CPU 990 and the GPU 992, and data and the like used by the programs executed by the CPU 990 and the GPU 992. The computer 970 further includes: a network I/F (Interface) 1008 which provides connection to a network 986 that allows communication with the in-vehicle device and various infrastructure sensors; and a USB port 1006 to/from which a USB (Universal Serial Bus) memory 984 is attachable/detachable and which provides communication between the USB memory 984 and each component in the computer 970.

The computer 970 further includes a sound I/F 1004 connected to a microphone 982 and a speaker 980, and the bus 1010. The sound I/F 1004 has a function of: in accordance with an instruction of the CPU 990, reading out a sound signal, a video signal, and text data generated by the CPU 990 and stored in the RAM 998 or the SSD 1000 to drive the speaker 980 through analog conversion and an amplification process; and digitizing an analog sound signal from the microphone 982 and storing the digitized sound signal into an address, designated by the CPU 990, of the RAM 998 or the SSD 1000.

In the above embodiments, the computer program and the like that realize the functions of the edge server 62 and the edge server 810 are each stored in the SSD 1000, the RAM 998, a DVD 978, or the USB memory 984 shown in FIG. 18, or in a storage medium or the like of an external device (not shown) connected through the network I/F 1008 and the network 986, for example. Typically, these data, parameters, and the like are written in the SSD 1000 from outside, for example, and are loaded into the RAM 998 at the time of execution by the computer 970.

The computer program for causing this computer system to operate so as to realize the functions of the edge server 62 and the edge server 810, and the components thereof is stored in the DVD 978 attached to the DVD drive 1002, and is transferred from the DVD drive 1002 to the SSD 1000. Alternatively, the program is stored in the USB memory 984, the USB memory 984 is attached to the USB port 1006, and the program is transferred to the SSD 1000. Alternatively, this program may be transmitted through the network 986 to the computer 970 and stored into the SSD 1000.

The program is loaded into the RAM 998 when being executed. It is understood that a source program may be inputted by using the keyboard 974, the monitor 972, and the mouse 976, and an object program after being compiled may be stored in the SSD 1000. In a case of a script language, a script inputted by using the keyboard 974 and the like may be stored in the SSD 1000. In a case of a program that operates on a virtual machine, a program that functions as the virtual machine needs to be installed in the computer 970 in advance. Since processing as a server involves a large amount of calculation, it is preferable to realize each component of the embodiments of the present disclosure as an object program composed of native codes of the computer, instead of a script language.

The CPU 990 reads out the program from the RAM 998 in accordance with an address indicated by a register (not shown) referred to as a program counter in the CPU 990, and interprets a command. The CPU 990 further reads out data necessary for execution of the command, from the RAM 998, the SSD 1000, or a device other than these, in accordance with an address designated by the command, and executes a process designated by the command. The CPU 990 stores data of the result of the execution into an address designated by the program, such as the RAM 998, the SSD 1000, a register in the CPU 990, or the like. At this time, the value of the program counter is also updated by the program. The computer program may be directly loaded into the RAM 998 from the DVD 978, from the USB memory 984, or through a network. Some tasks (mainly, numerical calculation) in the program executed by the CPU 990 are dispatched to the GPU 992 under a command included in the program or in accordance with a result of analysis during execution of the command by the CPU 990.

The program that realizes the function of each component according to each embodiment described above by means of the computer 970 includes a plurality of commands written and arranged so as to cause the computer 970 to operate so as to realize those functions. Some of basic functions necessary for executing these commands are provided by an operating system (OS) or a program of a third party that operates on the computer 970, or by a module of various tool kits installed in the computer 970. Therefore, this program need not necessarily include all of the functions necessary for realizing the system and method of the embodiments. It is sufficient that this program includes commands for executing operations as the above-described devices and components thereof by dynamically calling at the time of execution of the program or statically linking, in the commands, an appropriate function or the function of a "programming tool kit" in a manner controlled such that a desired result is obtained. The method for operating the computer 970 as such is well known and thus is not repeated here.

The GPU 992 can perform parallel processing, and can execute a large amount of calculation associated with processing in a server, in a simultaneous and parallel manner or a pipeline manner. For example, a parallel computing element found in a program at the time of compiling the program, or a parallel computing element found at the time of execution of the program is dispatched as necessary from the CPU 990 to the GPU 992 and is executed, and the result is returned to the CPU 990 directly or through a predetermined address of the RAM 998, and is substituted into a predetermined variable in the program.

Figure 19:
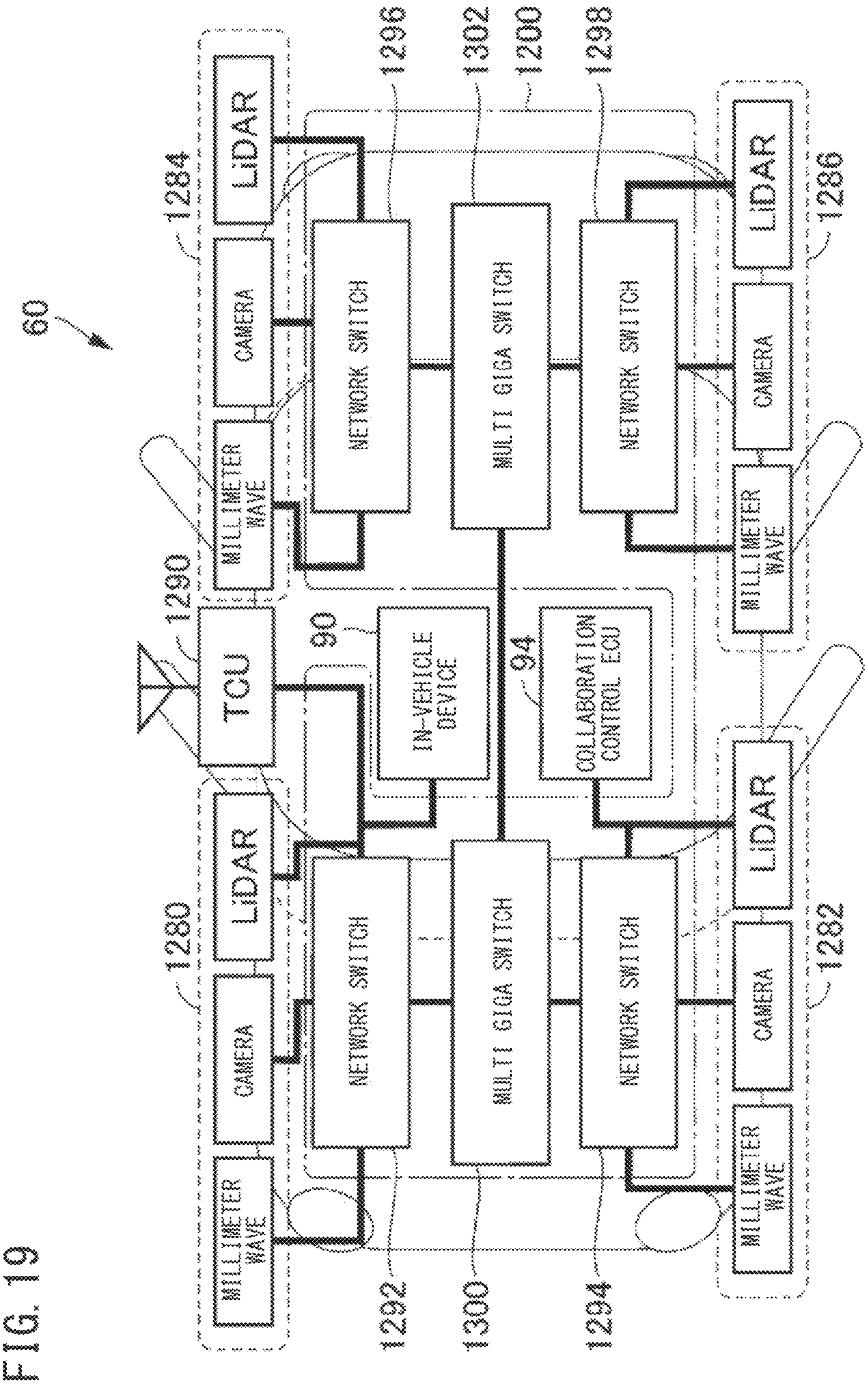
FIG. 19 is a block diagram showing a network configuration in a vehicle having mounted thereto the in-vehicle device in the first embodiment and the second embodiment.

FIG. 19 shows an example of a sensor arrangement and a network configuration of the vehicle 60. With reference to FIG. 19, the vehicle 60 includes: a network 1200 having a gigabit-class transmission speed and having connected thereto the above-described in-vehicle device 90 and collaboration control ECU 94; and a sensor unit 1280, a sensor unit 1282, a sensor unit 1284, and a sensor unit 1286 respectively mounted to a right front part, a left front part, a right rear part, and a left rear part of the vehicle 60.

Each of the sensor unit 1280, the sensor unit 1282, the sensor unit 1284, and the sensor unit 1286 includes a millimeter wave radar, a camera, and a LiDAR.

In this embodiment, the in-vehicle network 1200 includes four gigabit-class network switches 1292, 1294, 1296, and 1298 each having connected thereto sensors belonging to the same sensor unit. The in-vehicle network 1200 further includes: a first multi giga switch 1300 bridging the two network switches 1292 and 1294 in the front of the vehicle; and a second multi giga switch 1302 bridging the two network switches 1296 and 1298 in the rear of the vehicle and connected to the first multi giga switch 1300. The in-vehicle device 90 is connected to the network switch 1292 and the collaboration control ECU 94 is connected to the network switch 1294. A TCU (Telematics Control Unit) 1290 corresponding to the external communication device 154 shown in FIG. 2 is connected to the network switch 1292 together with the in-vehicle device 90.

In this manner, the sensor unit 1280, the sensor unit 1282, the sensor unit 1284, and the sensor unit 1286 are disposed at different positions in the vehicle. Therefore, depending on the situation where the vehicle is in, values of sensor data from these sensor units may be different as described later. The amount of data from various sensors, in particular, from cameras, is large. Although not shown in FIG. 19, as will be described later with reference to FIG. 20, many ECUs are provided in the vehicle. Those ECUs each communicate with the in-vehicle device 90 through the network 1200. Therefore, delay may sometimes be caused in communication through the network 1200. This delay is a matter that should be taken into consideration when the vehicle 60 functions as the substitute server vehicle.

Figure 20:
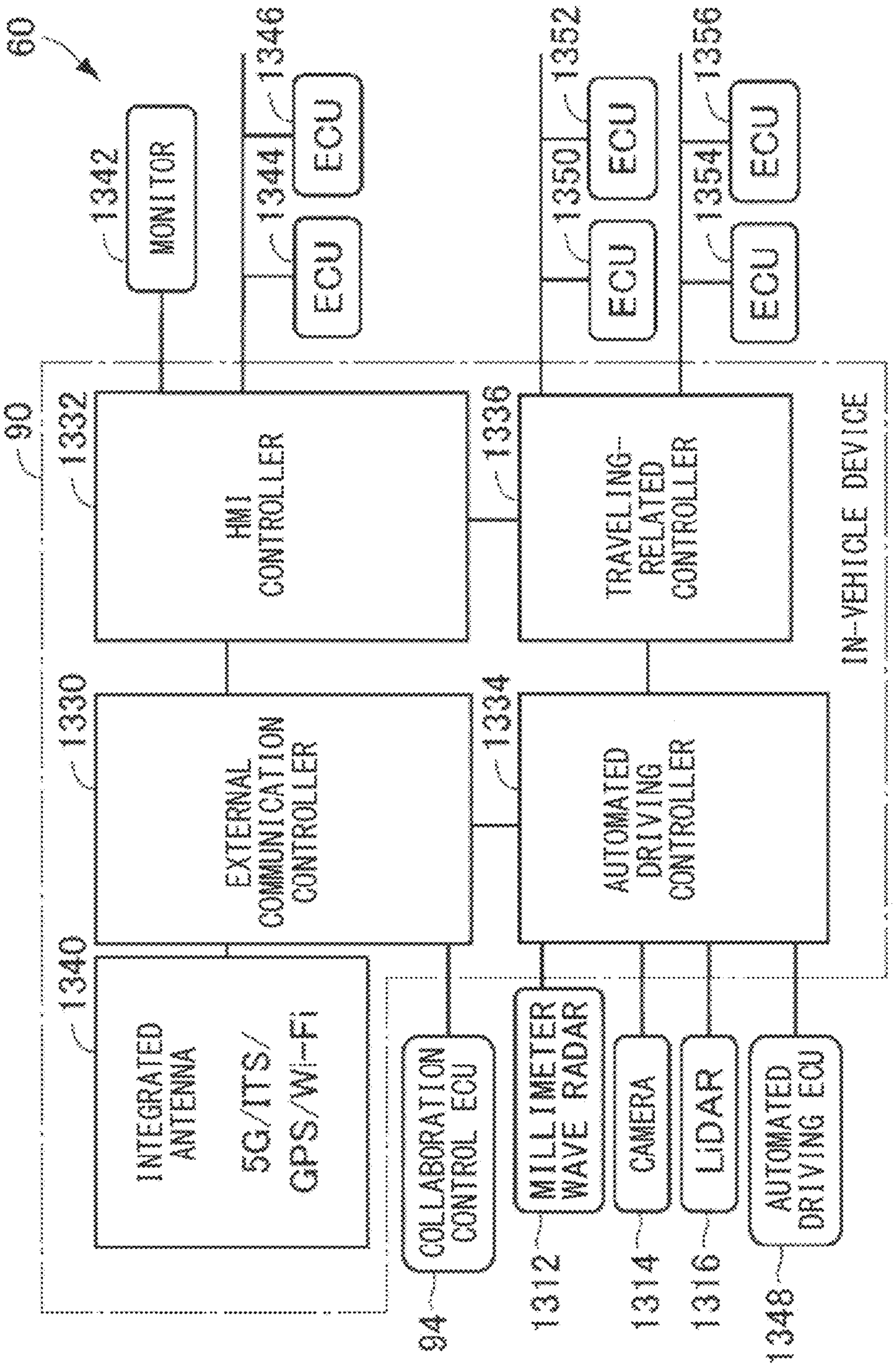
FIG. 20 is a block diagram showing a schematic hardware configuration of the in-vehicle device.

FIG. 20 is a block diagram showing a schematic hardware configuration of the in-vehicle device 90. With reference to FIG. 20, the in-vehicle device 90 includes: an HMI (Human-Machine Interface) controller 1332 connected to an in-vehicle LAN (Local Area Network); and an external communication controller 1330 connected to the in-vehicle LAN, similar to the HMI controller 1332. The in-vehicle device 90 further includes an integrated antenna 1340 which is connected to the external communication controller 1330 and which functions as an antenna for the 5th-generation mobile communication system (so-called "5G"), Intelligent Transport Systems (so-called "ITS"), GPS (Global Positioning System), and Wi-Fi. GPS is one type of GNSS (Global Navigation Satellite System). The in-vehicle device 90 further includes; an automated driving controller 1334 connected to the HMI controller 1332 and the external communication controller 1330 through the in-vehicle LAN; and a traveling-related controller 1336 connected to the in-vehicle LAN.

The HMI controller 1332 has connected thereto a monitor 1342 and a plurality of ECUs 1344 and 1346.

The automated driving controller 1334 has connected thereto a millimeter wave radar 1312, an in-vehicle camera 1314, a LIDAR 1316, and an automated driving ECU 1348. The traveling-related controller 1336 has connected thereto an ECU 1350, an ECU 1352, an ECU 1354, an ECU 1356, and the like for controlling traveling of the vehicle.

These ECUs and the in-vehicle device 90 are each substantially a computer, and includes therein a processor and a dedicated memory (not shown). These processors and memories can also have apportioned thereto, in accordance with control from the in-vehicle device 90, various processes for causing the vehicle 60 to function as the substitute server vehicle through cooperation with the in-vehicle device 90. Therefore, the operation statuses of those processors and the use statuses of the memories should also be taken into consideration when performing determination as to whether or not functioning as the substitute server vehicle is possible.

IV. Modification

In the above embodiments, the mini edge server 188 is activated only in the distribution mode, and is stopped upon ending of the distribution mode. However, this disclosure is not limited to such an embodiment. For example, the mini edge server 188 may be always activated so as to be able to immediately operate as a substitute for the edge server when the distribution mode is set. Alternatively, the mini edge server 188 may be activated only in the distribution mode, with the mini edge server initialization unit 190 caused to periodically operate. In this case, initialization work at activation of the mini edge server 188 can be omitted, and the time period until functioning as the substitute server vehicle substituting for the edge server can be shortened.

In the above embodiments, the substitute server vehicle list lists only those that can operate as a distribution server. However, this disclosure is not limited to such an embodiment. The substitute server vehicle list may include those that can operate only as a transfer server, in addition to those that can perform distribution. Alternatively, as the substitute server vehicle list, a list of distribution servers and a list of transfer servers are separately created, and both of them may be transferred. In this case, a vehicle in which communication with the edge server has been interrupted first selects a vehicle from the list of the transfer servers and requests transfer of a dynamic map, and when the dynamic map is not transferred, may access a distribution server. Then, concentration of requests to the substitute server vehicle can be prevented when transfer is sufficient.

In the above embodiments, a vehicle in which communication with the edge server has been interrupted transmits the distribution request staring from the top of the substitute server vehicle list in order. However, this disclosure is not limited to such an embodiment. For example, the order of selecting a vehicle listed in the substitute server vehicle list may be made random. Then, concentration of the distribution requests to the vehicle listed at the top of the substitute server vehicle list is avoided. In order to obtain the same effect, the substitute server vehicle list may be randomly rearranged before a vehicle is selected. Alternatively, when the substitute server vehicle list is to be transmitted to each vehicle from the edge server, the substitute server vehicle list may be remade such that the order is different for each vehicle.

The above embodiments assume a case where the dynamic map is transmitted as a driving support service. However, this disclosure is not limited to such an embodiment. Other than the dynamic map, this disclosure can also be applied to a driving support service that transmits, to vehicles, traffic information, road circumstances, weather, event information, or the like. That is, the driving support information is not limited to the dynamic map, and includes any information for supporting driving.

The embodiments disclosed herein are merely illustrative in all aspects and should be considered not restrictive. The scope of the present disclosure is defined by the scope of the claims rather than the detailed description of the disclosure, and is intended to include meaning equivalent to the scope of the claims and all modifications within the scope.

REFERENCE SIGNS LIST

50 driving support system
60 vehicle
62, 810 edge server
80, 1312 millimeter wave radar
82, 1314 in-vehicle camera
84, 1316 LiDAR
90 in-vehicle device
92 various ECUs
94 collaboration control ECU
150 in-vehicle gateway
152 vehicle inside-outside collaboration unit
154 external communication device
156 driving support information storage
158 selection unit
180 communication state detection unit
182 collaboration operation decision unit
184 distribution request buffer

186 transfer unit
188 mini edge server
190 mini edge server initialization unit
192 mini edge server output storage
250 node storage
252 sensor data collection unit
254 sensor data buffer
256 sensor data analysis unit
300 node information update unit
302 node information DB
304 vehicle resource DB
306 timer
308 number-of-nodes decision unit
310 node decision unit
350 communication device
352 reception unit
354 vehicle management unit
356 vehicle information storage
358, 902 substitute server vehicle list creation unit
360 substitute server vehicle list storage
362 dynamic map creation unit
364 dynamic map storage
366 substitute server vehicle list addition unit
368 transmission unit
400, 402, 404, 406, 408, 410, 420, 422, 450, 452, 454, 456, 458, 460, 462, 470, 472, 474, 476, 478, 480, 500, 502, 504, 506, 550, 552, 554, 556, 558, 560, 600, 602, 604, 606, 650, 652, 654, 656, 658, 660, 700, 702, 704, 750, 752, 754, 756, 758, 920, 922, 924, 926, 928, 930, 932, 940, 942, 944, 950, 952 step
800 management region
820, 822, 824 region
830, 832, 834 intersection
850, 870 graph
860, 862, 864, 880, 882, 884 node
900 region management unit
970 computer
972, 1342 monitor
974 keyboard
976 mouse
978 DVD
980 speaker
982 microphone
984 USB memory
986, 1200 network
990 CPU
992 GPU
996 ROM
998 RAM
1000 SSD
1002 DVD drive
1004 sound I/F
1006 USB port
1008 network I/F
1010 bus
1280, 1282, 1284, 1286 sensor unit
1290 TCU
1292, 1294, 1296, 1298 network switch
1300, 1302 multi giga switch
1330 external communication controller
1332 HMI controller
1334 automated driving controller
1336 traveling-related controller
1340 integrated antenna
1344, 1346, 1350, 1352, 1354, 1356 ECU
1348 automated driving ECU

The invention claimed is:

1. An in-vehicle device comprising:
a wireless communication device; and
processing circuitry configured to:
perform driving support for a vehicle by using support information received from an external server through the wireless communication device,
in response to having received a distribution request for support information from another in-vehicle device, perform a determination as to whether or not the in-vehicle device is to operate as a substitute for the external server, and
when the determination as to whether or not the in-vehicle device is to operate as the substitute for the external server is positive, transmit support information of the vehicle, usable by the in-vehicle device, to the other in-vehicle device through the wireless communication device.

2. The in-vehicle device according to claim 1, wherein
the support information received from the external server includes driving support information and a list of vehicles capable of operating as a substitute server, and
the processing circuitry is configured to perform the determination as to whether or not the in-vehicle device is to operate as the substitute for the external server in accordance with whether or not the vehicle having the in-vehicle device mounted thereto is listed in the list.

3. The in-vehicle device according to claim 2, wherein the processing circuitry is configured to:
perform a determination as to whether or not the support information is receivable from the external server through the wireless communication device, and
when the determination as to whether or not the in-vehicle device is to operate as the substitute for the external server in accordance with whether or not the vehicle having the in-vehicle device mounted thereto is listed in the list is positive and the determination as to whether or not the support information is receivable from the external server through the wireless communication device is positive, transfer the driving support information received from the external server to the other in-vehicle device in response to having received the distribution request for the support information from the other in-vehicle device.

4. The in-vehicle device according to claim 3, further comprising a buffer configured to store, in a first-in and first-out manner, the distribution request received from the other in-vehicle device,
wherein the processing circuitry is configured to:
read out the distribution request from the buffer, and
if an elapsed time period from a reception time of the read out distribution request to a current time is longer than a threshold time period, ignore the distribution request.

5. The in-vehicle device according to claim 3, further comprising an internal server configured to generate driving support information by using information usable by the in-vehicle device,
wherein the processing circuitry is configured to:
when the determination as to whether or not the in-vehicle device is to operate as the substitute for the external server in accordance with whether or not the vehicle having the in-vehicle device mounted thereto is listed in the list is positive and the determination as to whether or not the support information is receivable from the external server through the wireless communication device is negative, initialize and activate the internal server in response to having received the distribution request for the support information from the other in-vehicle device; and in response to having received the distribution request for the support information from the other in-vehicle device, distribute the driving support information generated by the internal server to the other in-vehicle device.

6. The in-vehicle device according to claim 5, further comprising a buffer configured to store, in a first-in and first-out manner, the distribution request received from the other in-vehicle device, wherein the processing circuitry is configured to:

read out the distribution request from the buffer, and if an elapsed time period from a reception time of the read out distribution request to a current time is longer than a threshold time period, ignore the distribution request.

7. The in-vehicle device according to claim 5, wherein the processing circuitry is configured to, when the determination as to whether or not the in-vehicle device is to operate as the substitute for the external server in accordance with whether or not the vehicle having the in-vehicle device mounted thereto is listed in the list is positive and the determination as to whether or not the support information is receivable from the external server through the wireless communication device is negative, initialize and activate the internal server in response to having received a plurality of the distribution requests of which the number exceeds a predetermined threshold from outside within a most recent predetermined time period.

8. The in-vehicle device according to claim 5, wherein the processing circuitry is configured to:

select a plurality of cooperation node candidates out of a plurality of other vehicles communicable through the wireless communication device;

select an arithmetic processing device for realizing a function of the internal server;

acquire information about the selected arithmetic processing device and a dynamic state regarding communication with the arithmetic processing device, and information about a dynamic state regarding communication with outside;

select at least one cooperation node based on the selected cooperation node candidates, the dynamic state regarding the communication with the arithmetic processing device, and the dynamic state regarding the communication with the outside;

decide a type of sensor data collected from the at least one cooperation node, a vehicle as a destination to which the driving support information is distributed, and a distribution cycle of the driving support information; and transfer the decided type of sensor data, the decided vehicle as the destination, and the decided distribution cycle to a storage device of the internal server.

9. The in-vehicle device according to claim 5, wherein the processing circuitry is configured to periodically initialize and activate the internal server.

10. The in-vehicle device according to claim 3, further comprising wherein the processing circuitry is configured to, when the determination as to whether or not the in-vehicle device is to operate as the substitute for the external server in accordance with whether or not the vehicle having the in-vehicle device mounted thereto is listed in the list is negative and the determination as to whether or not the support information is receivable from the external server through the wireless communication device is negative, transmit a distribution request for the support information to at least one of the vehicles listed in the list.

11. The in-vehicle device according to claim 10, wherein the processing circuitry is configured to transmit the distribution request starting from a top of the list in order until receiving a reply of the support information.

12. The in-vehicle device according to claim 11, wherein the processing circuitry is configured to rearrange the list at random before starting transmission of the distribution request.

13. The in-vehicle device according to claim 10, wherein the processing circuitry is configured to select a vehicle at random from the list and transmit the distribution request thereto.

14. The in-vehicle device according to claim 1, wherein the processing circuitry is configured to, in response to having received an information distribution request for requesting transmission of information regarding a static specification and a dynamic state of the in-vehicle device from the external server, transmit, to the external server, information regarding:

the static specification or the dynamic state of the in-vehicle device; and a static specification or a dynamic state of a calculation resource or a communication resource usable by the in-vehicle device in the in-vehicle device.

15. The in-vehicle device according to claim 1, wherein the processing circuitry is configured to:

periodically perform the determination as to whether or not the in-vehicle device is to operate as the substitute for the external server; and when a result of the periodic determination as to whether or not the in-vehicle device is to operate as the substitute for the external server is different from a preceding result, notify the external server of the result of the periodic determination.

16. A method for causing an in-vehicle device to operate, the method comprising:

performing, by a computer, driving support for a vehicle by using support information received from an external server through a wireless communication device;

performing, by the computer and in response to having received a distribution request for support information from another in-vehicle device, a determination as to whether or not the computer is to operate as a substitute for the external server; and transmitting, by the computer and when the determination as to whether or not the computer is to operate as the substitute for the external server is positive, support information, usable by the computer, to the other in-vehicle device through the wireless communication device.

17. A non-transitory computer readable storage medium storing a computer program for causing a computer connected to a wireless communication device to perform a method, the method comprising:

performing driving support for a vehicle by using support information received from an external server through a wireless communication device;

performing, in response to having received a distribution request for support information from another in-vehicle device, a determination as to whether or not the computer is to operate as a substitute for the external server; and transmitting, when the determination as to whether or not the computer is to operate as the substitute for the external server is positive, support information, usable by the computer, to the other in-vehicle device through the wireless communication device.

18. A driving support server configured to create support information for supporting driving in a management region and transmit the support information to vehicles in the management region, the driving support server comprising:

processing circuitry configured to:

receive sensor data from a sensor that detects a traffic state of the management region;

create the support information;

collect vehicle information regarding the vehicles present in the management region;

create a substitute server vehicle list that is a list of vehicles capable of operating as a substitute server for the driving support server;

add the substitute server vehicle list to the support information; and transmit the support information including the substitute server vehicle list to the vehicles.

19. The driving support server according to claim 18, wherein the processing circuitry is configured to:

divide the management region into a plurality of division regions;

create the substitute server vehicle list for each of the plurality of division regions; and for each of the plurality of division regions, attach the substitute server vehicle list for the division region to the support information, and transmit the support information including the attached substitute server vehicle list to each vehicle present in the division region.

20. A driving support method performed in a driving support system including a driving support server configured to create support information for supporting driving in a management region and transmit the support information to vehicles in the management region, the driving support method comprising:

receiving, by a computer, sensor data from a sensor that detects a traffic state of the management region;

creating, by the computer, the support information;

collecting, by the computer, vehicle information regarding vehicles present in the management region;

creating, by the computer, a substitute server vehicle list being a list of vehicles capable of operating as a substitute server for the driving support server;

adding, by the computer, the substitute server vehicle list to the support information; and transmitting the support information including the substitute server vehicle list to the vehicles.

* * * * *